United States Patent [19]

Murakami et al.

[11] Patent Number: 5,671,226
[45] Date of Patent: Sep. 23, 1997

[54] MULTIMEDIA INFORMATION PROCESSING SYSTEM

[75] Inventors: Tokumichi Murakami; Kazuhiro Matsuzaki; Yoshiaki Kato; Hideo Ohira, all of Kanagawa, Japan

[73] Assignee: Mitsubishi Denki Kabushiki Kaisha, Tokyo, Japan

[21] Appl. No.: 462,519

[22] Filed: Jun. 5, 1995

[30] Foreign Application Priority Data

Feb. 9, 1995 [JP] Japan .................................... 7-021699

[51] Int. Cl.⁶ .................................................. H04L 12/56
[52] U.S. Cl. ............................ 370/474; 370/537; 348/423; 395/514 A
[58] Field of Search ............................ 370/60, 60.1, 94.1, 370/94.2, 99, 389, 474, 537–541; 348/423, 429; 395/514 A

[56] References Cited

U.S. PATENT DOCUMENTS 5,461,619  10/1995  Citta et al. ................................ 370/83
5,521,979   5/1996  Deiss ........................................ 380/20

OTHER PUBLICATIONS ronald K. Jurgen, Contributing Editor, Mar. 1992, pp. 24–30, IEEE Spectrum, "Digital Video".

Primary Examiner—Melvin Marcelo
Attorney, Agent, or Firm—Wolf, Greenfield & Sacks, P.C.

[57] ABSTRACT

A multimedia information processing system comprises an information-source coding section for generating an element packet containing coded multimedia information and additional information to specify the packet, a packet multiplexing section for generating multiplexed stream by multiplexing the element packet, and a transmission processing section for outputting the multiplexed stream as a transmission signal corresponding transmission media. In this multimedia information processing system, a processing sequence from selection of multimedia information to transmission or storage processing is classified, and the processing contents and input/output data are determined for each hierarchy. Data exchange between services such as broadcasting, communication, storage in computer and so on can be easily attained. Additionally, hardware structure of this system can be simplified, and additional functions can be easily added.

23 Claims, 19 Drawing Sheets

1

MULTIMEDIA INFORMATION PROCESSING SYSTEM

BACKGROUND OF THE INVENTION

1. Field of the Invention

The present invention relates to a multimedia information processing system in which a digitalized video signal, an audio signal and other data are coded, multiplexed, and then, transmitted or stored, and the transmitted signal or the stored signal are demultiplexed, and then, decoded to generate the video signal, audio signal and other data. As specific applications of the multimedia information processing system, there are a video on demand (VOD), a digital broadcasting system, and a video conference system.

2. Description of the Prior Art

FIG. 17 is a block diagram showing a structure of a video encoder (transmitter) forming a conventional multimedia information processing system described in "A Video Code for Digital Satellite News gathering Systems", Mitsubishi Electric Corporation Technical Publication, Vol. 67, No. 7, pp 33–38, 1993.

In FIG. 17, reference numeral 91 is an information-source coding section which inputs a video signal 101, an audio signal 102, and the other data signal 103 and executes data compression for those signals. In the information-source coding section 91, a video coding portion 51 executes information-source coding of the video signal 101 to generate the video coded bits sequence 111. An audio coding portion 512 executes information-source coding of one or more audio signals 102 to generate one or more audio coded bits sequences 112. The data coding portion 513 executes various processings concerning the data signal 103 relating to the video signal 101 or the audio signal 102 to generate a data coded bits sequence 113.

A media multiplexing section 92 multiplexes the video coded bits sequence 111, the audio coded bits sequence 112 and the data coded bits sequence 113 from the information-source coding section 91 to generate one multiplexed bits sequence 122. A transmission processing section 93 provides the multiplexed bits sequence 122 with scramble processing and error correction coding in accordance with the types and characteristics of the transmission line. The transmission processing section 93 further executes channel multiplexing processing for the multiplexed bits sequence 122 and one or more other multiplexed bits sequences 123. Furthermore, the transmission processing section 93 executes the formation of a transmission frame and modulating processing and so on are executed to generate a transmission signal 141.

FIG. 18 is a block diagram showing a structure of a video decoder (receiver) forming the multimedia information processing system described in the above report. In FIG. 18, reference numeral 96 denotes a receive processing section which receives the transmission signal 141, executes demodulating processing, synchronization of the transmission frame, regeneration of the transmission frame and separation of the channel multiplexing processing to select a specific channel signal. The receive processing section 96 further executes error detecting processing, error correcting processing and descramble processing or the like to reproduce multiplexed bits sequence 122 or one or more other multiplexed bits sequences 123.

A media demultiplexing section 95 separates the multiplexed bits sequence 122 into the video coded bits sequence 111, one or more audio coded bits sequences 112 and one or more data coded bits sequences 113.

An information-source decoding section 94 inputs the video coded bits sequence 111, one or more audio coded bits sequences 112 and one or more data coded bits sequences 113 and also outputs the video signal 101, one or more audio signals 102 and one or more data signals 103. In the information-source decoding section 94, a video decoding portion 514 executes information-source decoding of the video coded bits sequence 111 to reproduce the video signal 101. An audio decoding portion 515 executes information-source decoding of the one or more audio coded bits sequences 112 to reproduce the audio signal 102 relating to the video signal 101. A data decoding portion 516 executes various reverse processings to the data coded bits sequence 113 to reproduce the data signal 103 relating to the video signal 101 and audio signal 102.

Operations in the transmission side of the multimedia information processing system will now be described. The information-source coding section 91 reduces redundant components of the respective signals by use of information-source coding method. Information of the video signal 101 and the one or more audio signals 102 which are accompanied therewith are coded in a video coding portion 511 and audio coding portion 512 respectively. Information of the data signal 103 including synchronization signals and control signals relating to the video signal and audio signal are also coded in a data coding portion 513 as in the case of the video signal and audio signal, thereby converting the data structure to form one or more data coded bits sequences 113.

The media multiplexing section 92 multiplexes the video coded bits sequence 111, audio coded bits sequence 112 and data coded bits sequence 113 into one multiplexed bits sequence 122. The multiplexing is executed by use of a given frame as a unit. FIG. 19 is an explanatory view explaining multiplexed frame generated in the media multiplexing section 92. As shown in FIG. 19, a predetermined sized multiplexed frame 80 is composed of a synchronizing information area 81 for securing the synchronization of the multiplexed frame, a video information area 82, audio information area 83 and a data information area 84. The video coded bits sequence 111, the audio coded bits sequence 112 and the data coded bits sequence 113 are provided in the video information area 82, the audio information area 83, and the data information area 84 respectively and are read out in the order shown with arrow in FIG. 19 (from the left upper portion to the right lower portion), so that the multiplexed bits sequence 122 is generated. To multiplex signals using such a multiplexed frame as a unit is referred to as "structure multiplexing" in this specification.

The transmission processing section 93 executes scramble processing for the multiplexed bits sequence 122 and adds error correcting codes to the multiplexed bits sequence 122. Further, the transmission processing section 93 executes channel multiplexing for the multiplexed bits sequence 122 and other one or more multiplexed bits sequences 123 to generate a transmission frame. The transmission processing section 93 then executes modulation processing or the like for the transmission frame to generate a transmission signal 141.

The scramble processing in the transmission processing section 93 will be described using FIG. 20(a). FIG. 20(a) shows one example of a circuit that realize a scramble processing referred to as a PN (Pseudo Noise) signal summing system. In FIG. 20(a), reference numeral 73a denotes a pseudo random number generator for scramble and 75 an exclusive-OR circuit. The random number generator 73a generates a pseudo random number sequence 74a responsive to an initial value 72a. The exclusive-OR circuit 75 executes exclusive-OR operation of original data 71 and the pseudo random number sequence 74 a as a bit unit to obtain scrambled data 76.

A structure of the error correction frame in a case where the transmission processing section 93 executes error correction coding will be described. FIG. 21 is a block diagram of an error correction frame 77 in a case where the Reed-Solomon (RS) code is used as the error correction code. In FIG. 21, reference numeral 78a denotes synchronizing information to establish synchronization of the error correction frame 77, 78b M bytes code word (RS (M, M- N) code word), 79a an information field which stores N bytes information symbols which is protected by the error correction coding, and 79b a check field which stores check symbols which is added to detect error detection.

A channel multiplexing method for the P channels in the transmission processing section 93 will be described with reference to FIG. 22. Each channel corresponds to each program in television broadcasting for example. A channel multiplexing frame 90 includes synchronizing information 90a to establish synchronization of the channel multiplexing frame 90. The channel multiplexing is executed by using the structure multiplexing system.

A transmission frame will be described with reference to FIG. 23. The transmission frame is defined in dependence on the characteristics of the transmission line. Various transmission frames are defined in accordance with the respective types such as the cable transmission, satellite wave transmission and ground wave transmission and so on. FIG. 23 shows one embodiment of a structure of a transmission frame. As shown in FIG. 23, a transmission frame 85 is composed of an additional information area 86 and a transmission information area (pay load) 87. Timing information, synchronizing information and information that is used for securing the transmission line, or the like are contained in the additional information area 86. The information that forms the transmission frame 85 is read out in a desired order shown with the arrows in FIG. 23. After the transmission frame 85 was modulated, it is sent to a transmission line as a transmission signal 141.

Next, operations on the receive side of the multimedia information processing system will be described. The operations on the receive side is reverse to those on the transmission side, which were previously described. Namely, after the receive processing section 96 demodulated the received transmission signal 141, it establishes the synchronization of the transmission frame 85 and reproduces, using the synchronizing information in the additional information area 86, and takes out the transmission information area 87. In a case where a signal in the transmission information area 87 is channel multiplexed, the receive processing section 96 establishes the synchronization of the channel multiplexing frame 90 and reproduces, using the synchronizing information 90a, and separates the respective channel information. When each channel information is an error correction coded signal, the receive processing section 96 establishes synchronization of the error correction frame 77 and reproduces, using the synchronizing information 78a. After that, the receive processing section 96 detects errors and correct them.

Descramble processing in the receive processing section 96 will be described using FIG. 20(b). In FIG. 20(b), reference numeral 73b denotes a pseudo random number generator for descramble and 75 an exclusive-OR circuit. The pseudo random number generator 73b to which an initial value 72b is given generates a pseudo random number sequence 74b. The pseudo random number generator 73b in a descramble circuit has the same structure as the pseudo random number generator 73a shown in FIG. 20(a). The initial value 72a is the same as the initial value 72b. The value of the pseudo random number sequence 74a coincides with that of the pseudo random number sequence 74b.

The media demultiplexing section 95 separates the multiplexed bits sequence 122 into the video coded bits sequence 111, one or more audio coded bits sequences 112 and one or more data coded bits sequences 113. The generation of the multiplexing frame 80 necessary for the separation is executed by using synchronizing information contained in the synchronizing information area 81 within the multiplexing frame 80.

In the information-source decoding section 94, The video coded bits sequence 111, audio coded bits sequence 12, and data coded bits sequence 113 are respectively decoded through information-source decoding or various reverse processing by the video decoding section 514, audio decoding section 515 and data decoding section 516 to reproduce the video signal 101, the audio signal 102 relating to the video signal 101 and the data signal 103 relating to the video signal 101 or audio signal 102.

Since a conventional multimedia information processing system is constructed as described above, the processing contents in each processing section and the interface signal between the respective processing sections are fixedly indexed. Consequently, the conventional multimedia information lacks wide usableness.

Therefore, it is difficult to execute data exchange service among broadcasting system, communication system and storage system in computer. Further, it has been difficult to build hardware and add processing functions while maintaining interchangeable properties with other multimedia information processing systems.

Since, in the conventional multimedia information processing system, the video signal, audio signal, and other data have been structure-multiplexed by storing them in given areas in multiplexing frames, multiplexing processing difficult to deal with change in the transmission speed of information to be multiplexed from the respective media and existence of information from the respective media. Further, in a case where the number of media are large, the size of the multiplexing frame must be enlarged. As a result, long time has been required for establishing synchronization of the multiplexing frame on the receiver side.

SUMMARY OF THE INVENTION

The present invention has been made to solve the above problems. The first object of the present invention is to provide a multimedia information processing system in which, in a sequence of processing that includes from selection of media information to transmission processing or record processing, general-purpose properties in the data exchange service between broadcasting system, communicating system and storage system in computer or the like are improved, hardware construction is simplified, and addition of additional functions or the like is easily executed.

The second object of the present invention is to provide a multimedia information processing system in which, in a transmitter, information of the respective media is efficiently multiplexed by dealing with change in the number of media, change in the transmission speed of the respective media, and presence or absence of the respective media or the like, flexibly. Another object of the present invention is to provide a multimedia information processing system in which, information that is needed immediately on a receive side, such as control information, commanding information, clock information or the like can be multiplexed and transmitted on a transmitter side so that this system can access to those information easily and immediately.

A multimedia information processing system according to the first aspect of the present invention comprises: information-source coding means, which inputs a plurality of media information, codes the information by units of the respective media, adds sub-information to execute media identification, packet synchronization and establishing synchronization, and generates a signal type element packet that has interchangeability with other systems; packet multiplexing means, which execute speed matching and multiplexing of the element packets for the respective media which the information-source coding means outputs, and generates signal type multiplexing stream having multiplex interchangeability between systems; and transmitting processing means, which converts the multiplex stream in accordance with transmission media and storage media and outputs transmission signal.

The multimedia information processing system classifies a sequence of processing from inputting of media information to transmission processing into hierarchys and determines processing contents and I/O data in each hierarchy. Thus, data exchange between services such as broadcasting, communication, storage in computer or the like can be easily executed. Namely, flexibility in services can be attained. Further, hardware construction can be simplified and adding functions and so on can be easily added. Consequently, various applications can be developed.

In a multimedia information processing system according to the second aspect of the present invention, the information-source coding means comprises: element media selecting means for editing media information in element media; information-source coding means for reducing amount of element information; and element packet generating means for inputting output of the information-source coding means to generate an element packet.

The multimedia information processing system codes the respective element information, adds additional information, and generates a signal type element packet having interchangeability between systems. Therefore, the respective media information can be easily reproduced.

In a multimedia information processing system according to the third aspect of the present invention, the packet multiplexing means comprises: a packet generating portion for adding additional information to execute media identification corresponding to the media information and synchronization for packet regeneration or the like; and packet multiplexing means for executing speed matching for the element packet and multiplexing to generate multiplexing stream.

The multimedia information processing system adds additional information for media identification corresponding to the media information and for synchronization of packet regeneration or the like and executes speed matching for the element packet and multiplexing to generate multiplexing stream. Therefore, the multimedia information processing system can deal with change in the transmission speed of the respective media to be multiplexed and can separate multiplexing stream to element packets.

In a multimedia information processing system according to the fourth aspect of the present invention, transmitting processing means comprises: error correction coding means for correcting errors in accordance with transmitting media or storage media such as cable transmission media, radio transmission media, digital storage media or the like; transmission frame generating means for executing transmission framing process regarding output data from the error correction coding means; and modulating means for transmitting or recording output data of the transmission frame generating means. According to such a structure, transmission signals suitable for each transmission media or storage media or the like can be output.

A multimedia information processing system according to the fifth aspect of the present invention comprises: software processing means with application program for changing the operation modes of the information-source coding processing means or the packet multiplexing means.

According to this multimedia information processing system, the software processing means with application program changes the operation modes of the information-source coding processing means or the packet multiplexing means to be suited to application. Thus, the information-source coding processing means or the packet multiplexing means can be changed flexibly and wider services can be provided by one system. Namely, space-time video resolution, coding algorithm, bit rate, coding quality and the like can be freely provided by application program, in accordance with material of information output media, and suitable information-source coding processing matched to situations can be executed. Further, program contents which are transmitted can be freely changed.

In a multimedia information processing system according to the sixth aspect of the present invention, the packet multiplexing means adds additional information for media identification corresponding to media information, packet synchronization, and establishing synchronization or the like to generate fixed-length packet, and multiplexes while executing speed matching by using the fixed-length packet as a unit, so that required data can be selected on the receive side. According to the structure, a multimedia information processing system can deal with change in transmission speed of the respective information and separation from a fixed-length packet sequence to an element packet can be easily made.

In a multimedia information processing system according to the seventh aspect of the present invention, the transmitting processing means execute TCP/UDP/XTP processing for multiplexed stream, and then executes IP processing to send the multiplexed stream to internet protocol transmission line. Accordingly, transmission signals suitable for internet protocol transmission line can be sent.

A multimedia information processing system according to the eighth aspect of the present invention comprises: element packet storage means for storing element packets generated with one or more information-source coding processing means by using the element packet as a unit; address managing means for memorizing addresses of the element packets stored in the element packet storage means; and element packet transmitting means for outputting the element packet indicated by the address managing means from the element packet storage means to the packet multiplexing means.

According to such a structure, it is not necessary to execute coding processing at actual time. Further, when the packet is transmitted repeatedly, it is not necessary to execute coding again. Therefore, the coding processing can be executed effectively and for a short time. Since various media information is stored in a state where the amount of information is reduced, the memory capacity can be decreased. Further, since the information is stored in accordance with respective media, it is easy to change the selection of the media on multiplexing.

A multimedia information processing system according to the ninth aspect of the present invention comprises: multiplexed stream storage means for storing multiplexed stream generated by the packet multiplexing means; multiplexed stream managing means for memorizing the address of the multiplexed stream stored in the multiplexed stream storage means; and multiplexed stream transmitting means for outputting the multiplexed stream indicated by the multiplexed stream managing means from the multiplexed stream storage means to the transmission processing means.

Therefore, since transmission processing for required data can be executed by the multiplexed stream storage means at any time, it is not necessary to execute coding processing at actual time. When the multiplexed stream is transmitted repeatedly, it is not necessary to execute coding and multiplexing again. Thus, the coding processing can be executed effectively and for a short time. Since various media information is stored in a state where the amount of information is reduced, the memory capacity can be decreased.

A multimedia information processing system according to the tenth aspect of the present invention comprises: receive processing means for decoding a packet multiplexed signal transmitted at a type suited to transmission media, in accordance with the characteristics of the transmission media to output multiplexed stream; packet separating means for separating an element packet required for generating media information at each media unit from multiplexed stream; and information-source decoding processing means for executing information-source decoding the separated element packet at each media unit and reproducing media information according to additional information added to execute media identification, packet synchronization and establishing synchronization and the like.

This multimedia information processing system classifies a processing sequence that contains from the receive of transmitted packet multiplexed signal to the regeneration of information, and determines processing contents and input/output data in each hierarchy. Thus, since data exchange between services such as broadcasting, communication and storage in computer becomes easy, flexible service can be obtained. Further, hardware structure can be simplified, and addition of additional functions become easy. Therefore, various application can be developed.

In multimedia information processing system according to the eleventh aspect of the present invention, the receive processing means comprises: demodulating means for demodulating the packet multiplexed signal in accordance with the characteristics of transmission media; transmission frame reproducing means for establishing transmission frame synchronization from the output signal of the demodulating means to decompose frame; and error correction decoding means for establishing error correction frame synchronization from the output of the transmission frame reproducing means to execute error correction decoding and outputting multiplexed stream. According to such a structure, by receiving the packet multiplexed signal from various transmission media, multiplexed stream can be reproduced.

In multimedia information processing system according to the twelve aspect of the present invention, when uncorrectable error has been generated, the error correction decoding means outputs multiplexed stream and a correction generating signal that indicates the area where the error exists, to packet separating means. According to such a structure, the packet separating means can be constructed so that when an error generating signal is inputted, packet separation is not executed. Thus, the decoding error or regeneration error of a decoder can be prevented and the decoding error can be separated from the transmission error. As a result, the operation management of the system becomes easy. In multimedia information processing system according to the thirteenth aspect of the present invention, when uncorrectable error has been generated, the error correction decoding means outputs multiplexed stream and a correction generating signal that indicates the area where the error exists.

According to such a structure, the information-source decoding processing means can be constructed so that when an error generating signal is inputted, information-source decoding is not executed. Thus, the decoding error or regeneration error of a decoder can be prevented and the decoding error can be separated from the transmission error. As a result, the operation management of the system becomes to be easy.

In a multimedia information processing system according to the fourteenth aspect of the present invention, the information-source decoding means comprises: packet separating means for separating additional information and coded element media information from an element packet; information-source decoding means for decoding the coded element media information; and decoded data reproducing means for synchronizing decoded element media information, which the information-source decoding means outputs, to reproduce media information. According to such a structure, regeneration of media information in accordance with respective media becomes to be easy.

A multimedia information processing system according to the fifteenth aspect of the present invention comprises: software processing means having an application program that changes operation mode of the information-source decoding processing means or the packet separating means.

In this multimedia information processing system, software processing means having an application program changes the information-source decoding processing means or the packet separating means. According to such a structure, the information-source decoding processing means or the packet separating means is changed flexibly, whereby wider services can be provided by one system. Namely, programs which a user requires can be selected with the application program, resulting in improvement of utility and operability. Additionally, high speed regeneration can be instructed or decoding method can be selected, thereby attaining many functions.

In a multimedia information processing system according to the sixteenth aspect of the present invention, the packet separating means separates multiplexed stream multiplexed by using an element packet as a unit, to each element packet unit and outputs each element packet to the information-source decoding processing means. According to such a structure, media information can be output at an element packet unit, in accordance with respective media.

In a multimedia information processing system according to the seventeenth aspect of the present invention, the packet separating means separates multiplexed stream multiplexed by using a fixed-length packet in which divided element packets are contained as a unit, to a fixed-length packet unit to reform the element packet, and outputs each element packet to the information-source decoding processing means. According to such a structure, high speed processing can be executed.

In a multimedia information processing system according to the eighteenth aspect of the present invention, the receive processing section executes IP processing of data that is transmitted from an internet protocol transmission line, and then, executes TCP/UDP/XTP processing to receive packet multiplexed stream. According to such a structure, receive processing suited to the internet protocol transmission line can be executed.

In a multimedia information processing system according to the nineteenth aspect of the present invention, the packet separating means comprises: received element packet storage portion for storing separated element packets; received program managing means for memorizing the addresses of the element packets stored in the received element packet storage portion; and received element packet reading means for outputting an element packet necessary for generating a program instructed from the received program managing means, from the received element packet storage means to the information-source decoding processing means.

According to such a structure, whenever required, packet separation and information-source decoding processing of required data can be executed. Thus, it is not necessary to execute information-source decoding processing at actual time. Further, whenever a user of the receiving side wants to watch the contents, he can use this system repeatedly, thereby improving operability. Further, since each media information is not stored after information-source decoding processing is executed, the memory capacity can be reduced.

A multimedia information processing system according to the twentieth aspect of the present invention comprises: receive processing means for inputting a packet multiplexed signal which was packet multiplexed and transmitted at a type suited to transmission media, from one or more transmission media, and generating multiplexed stream for each transmission media, which was decoded in accordance with characteristics of transmission media; packet separating means for separating the packet multiplexed stream into an element packet every transmission media; packet re-multiplexing means for re-multiplexing the element packet to one multiplexed stream; and transmission processing means for outputting the multiplexed stream, which the packet re-multiplexing means outputs to transmission media as a transmission signal in accordance with characteristics of the transmission media. Therefore, according to this system, data exchange between services such as broadcasting, communication, storage in computer, and so on becomes easy. Thus, flexible services can be attained. Further, hardware structure is simplified. In addition, since additional functions or the like can be added, various applications can be developed.

In this multimedia information processing system, a processing sequence from receive of the transmission signal and re-multiplexing, to transmission of the re-multiplexed signal is classified, processing contents for each hierarchy are determined, and input/output data in each hierarchy processing is determined.

A multimedia information processing system according to the twenty first aspect of the present invention comprises: information-source coding processing means for executing information-source coding respective different type signals to generate respective coded bits sequences; media multiplexing means for storing identification information to identify the type of signals and the respective coded bits sequences in a fixed length packet, and multiplexing every fixed length packet unit to generate fixed length packet sequence; structure multiplexing for storing a desired number of fixed length packets in the fixed length packet sequence, in a given sized frame together with various data; and transmission processing means for generating a transmission signal with a transmission frame suited to transmission media for the frame sequence output from the structure multiplexing means. According to such a structure, transmission signals can be effectively transmitted in flexible accordance with change in the transmission speed of the respective media, and the presence or absence thereof.

In a multimedia information processing system according to the twenty second aspect of the present invention, the structure multiplexing means is multiplexed with the fixed length packet by using control information, instruction information or clock information as various data.

In this multimedia information processing system, the structure multiplexing means is multiplexed with the fixed length packet by using a signal, which receive side needs immediately, such as control information, instruction information or clock information or the like as various data. According such a structure, the signal which the receive side needs immediately is not multiplexed at the packet unit, but structure multiplexed together with fixed packet sequence. Consequently, transmission and regeneration of signals can be executed immediately.

A multimedia information processing system according to the twenty third aspect of the present invention comprises: receive processing means for storing a predetermined number of fixed length packets in a predetermined sized frame together with various data, and receiving a transmission signal with transmission frame sequence suited to transmission media to reproduce multiplexed bits sequence; structure separating means for reproducing fixed length packet sequence and various data from the multiplexed bits sequence; media separating means for selecting a fixed length packet from fixed length packet sequence, and reproducing coded bits sequence corresponding to identification information that identifies the type of signals; and information-source decoding processing means for decoding the coded bits sequence to reproduce the respective different type signals. According to such a structure, information which is needed can be reproduced immediately from multiplexed bits sequence.

In a multimedia information processing system according to the twenty fourth aspect of the present invention, the structure separating means for separating various data, such as structure multiplexed control information, instruction information, or clock information or the like, and a fixed length packet. According to such a structure, information which is needed can be reproduced immediately from multiplexed bits sequence.

DETAILED DESCRIPTION OF THE PREFERRED EMBODIMENTS

Embodiments of the multimedia information processing system according to the present invention will be described below, with reference to drawings.

Embodiment 1

Figure 1:
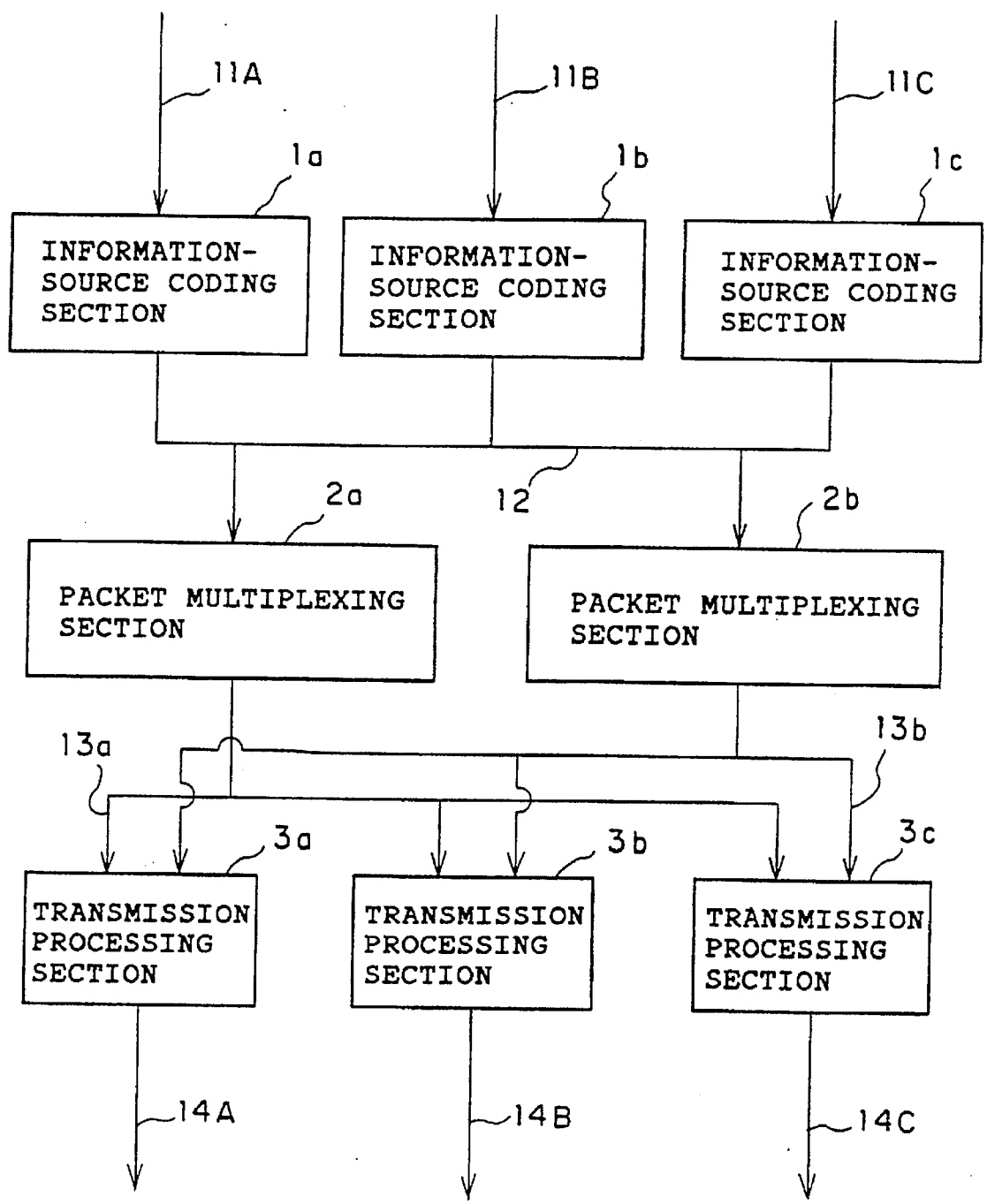
FIG. 1 is a block diagram showing a structure of a transmitter in a multimedia information processing system according to the first embodiment of the present invention.

FIG. 1 is a block diagram showing a transmitter in a multimedia information processing system according to the first embodiment of the present invention. In FIG. 1, reference numerals 1a, 1b and 1c denote information-source coding sections, which are provided in accordance with each application, and executing information-source coding of respective media information 11A, 11B and 11C. The media information 11A, media information 11B and media information 11C contain for example, a video signal and a data signal and so on independently. Reference numerals 2a and 2b denote packet multiplexing sections for multiplexing packets output from respective information-source coding sections 1a, 1b and 1c, 3a, 3b and 3c transmission processing sections which are provided in accordance with each transmission media, 13a and 13b multiplexed stream output from the packet multiplexing sections 2a and 2b, and 14A, 14B and 14C transmission signals in which transmitting processing is executed in accordance with specifications of transmission media.

The operation of the transmitter will now be described. An information-source coding section 1a corresponding to respective applications inputs a media information 11A containing a video signal, an audio signal, data signals and so on. An information-source coding section 1b inputs a media information 11B containing a video signal, an audio signal, data signals and so on. An information-source coding section 1c inputs a media information 11C containing a video signal, an audio signal, data signals and so on. The information-source coding sections 1a, 1b, and 1c execute information-source coding of the media information output with each media unit to generate information-source coded bits sequence with media as a unit. The media information that is output from respective media contains an information which is used in broadcasting and an information output from data storage media or the like. The respective information-source coding sections 1a, 1b and 1c divide the information-source coded bits sequence in accordance with a desired frame or desired time or the like, and generate segments. Next, the respective information-source coding sections 1a, 1b and 1c provide each segment with additional information, which is used for executing media identification, packet synchronization, and establishing synchronization or the like, so that the type of signals has interchangeability with other systems.

The packet multiplexing section 2a divides an element packet 12 corresponding to the media generated with the information-source coding sections 1a, 1b or 1c, and provides each data with additional information, which is used for executing media identification, packet synchronization, and establishing synchronization or the like, to generate a fixed length packet. Next, the packet multiplexing section 2a multiplexes with the fixed length packet as a unit while executing speed matching, and generates a multiplexed stream 13a with the type of signals, which has interchangeability with other systems.

The packet multiplexing section 2b multiplexes an element packet 12 corresponding to the media generated with the information-source coding sections 1a, 1b or 1c, with the fixed length packet as a unit while executing speed matching, and generates a multiplexed stream 13b with the type of signals, which has interchangeability with other systems.

The transmitter in the multimedia information processing system according to embodiment 1 includes the packet multiplexing section 2a and packet multiplexing section 2b.

Nevertheless, if the transmitter includes any one of them, the functions can be effected. In such a case, either multiplexed stream 13a or multiplexed stream 13b only can be used.

The transmission processing sections 3a, 3b and 3c provides the multiplexed stream 13a or multiplexed stream 13b with transmission processing in accordance with transmission media such as cable transmission, satellite wave transmission, ground wave transmission or the like, or in accordance with the specifications of the transmission media, and generates transmission signals 14A, 14B and 14C. The transmission signals 14A, 14B and 14C are transmitted through the corresponding transmission media.

Thus, the information-source coding sections 1a, 1b and 1c generate an element packet 12 corresponding to the respective applications, and the packet multiplexing sections 2a and 2b generate the multiplexed stream 13a and 13b. The transmission processing sections 3a, 3b, and 3c output the transmission signals 14A, 14B and 14C. Therefore, classified processing is executed. If processing contents are determined every hierarchy, and further, input/output data in each hierarchy is determined, data exchange between services such as broadcasting, communication, data storage in computer or the like can be further easily attained. Thus, flexible services can be obtained. Additionally, hardware structure is simplified, and additional functions are easily added.

Embodiment 2

Figure 2:
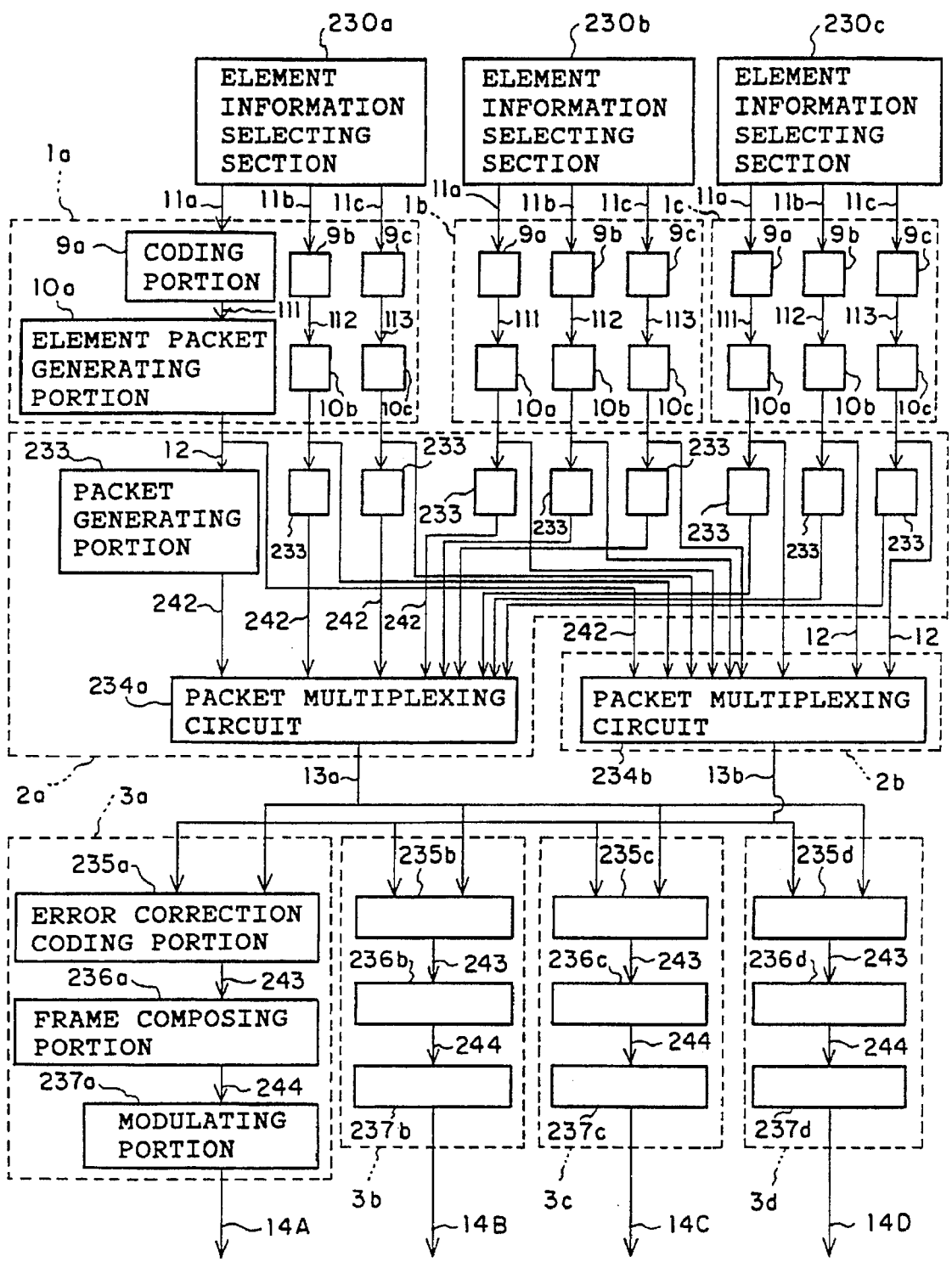
FIG. 2 is a block diagram showing a structure of a transmitter in a multimedia information processing system according to the second embodiment of the present invention.

FIG. 2 is a block diagram showing a structure of a transmitter in a multimedia information processing system according to the second embodiment of the present invention. As shown in FIG. 2, in this case, element information selecting sections 230a, 230b and 230c corresponding to the respective applications are provided. The element information selecting sections 230a, 230b and 230c input information from the corresponding media respectively, and provide the information-source coding means 1a, 1b and 1c with each element information. As the element information, there are, for example, video information, audio information corresponding thereto, and information relating to the video information and audio information. In embodiment 2, a case where a video coding portion, an audio coding portion, and a data coding portion are provided in the information-source coding means 1a, 1b and 1c will be described.

In the respective information-source coding means 1a, 1b and 1c, the video coding portion 9a executes information-source coding of the video signal 11a to generate video coded bits sequence 111, and the audio coding portion 9b executes information-source coding of the audio signal 11b relating to the video signal 11a to generate audio coded bits sequence 112, and the data coding portion 9c executes various processing for the data signal 11c relating to the video signal 11a and/or the audio signal 11b to generate data coded bits sequence 113. The respective information-source coding means 1a, 1b and 1c are provided with an element packet generating portion 10a that inputs the video coded bits sequence 111 output from the video coding portion 9a, an element packet generating portion 10b that inputs the audio coded bits sequence 112 output from the audio coding portion 9b, and an element packet generating portion 10c that inputs the data coded bits sequence 113 output from the data coding portion 9c.

The packet multiplexing section 2a contains a packet generating portion 233 corresponding to respective element packet generating portions 10a, 10b and 10c in the respective information-source coding means 1a, 1b and 1c, and a packet multiplexing circuit, which inputs packet data 242 output from each packet generating portion 233 and multiplexes the packet data 242. The packet multiplexing section 2b contains a packet multiplexing circuit, which multiplexes the element packet 12 output from respective element packet generating portions 10a, 10b and 10c in the respective information-source coding means 1a, 1b and 1c. The transmission processing sections 3a, 3b, 3c and 3d include error correction coding portions, which input multiplexed stream 13a output from the packet multiplexing section 2a and multiplexed stream 13b output from the packet multiplexing section 2b and error correction coding portions 235a, 235b, 235c and 235d, which execute error correction coding by the RS coding or the like, respectively. In the transmission processing sections 3a, 3b, 3c and 3d, code sequences 243 made by the error correction coding portions 235a, 235b, 235c and 235d are composed in frame composing portions 236a, 236b, 236c and 236d. The frame composed data 244 outputted by the frame composing portions 236a, 236b, 236c and 236d are modulated in modulating portions 237a, 237b, 237c and 237d to become transmission signals 14A, 14B, 14C and 14D. The respective transmission signals 14A, 14B, 14C and 14D are transmitted to the corresponding transmission lines.

Figure 3:
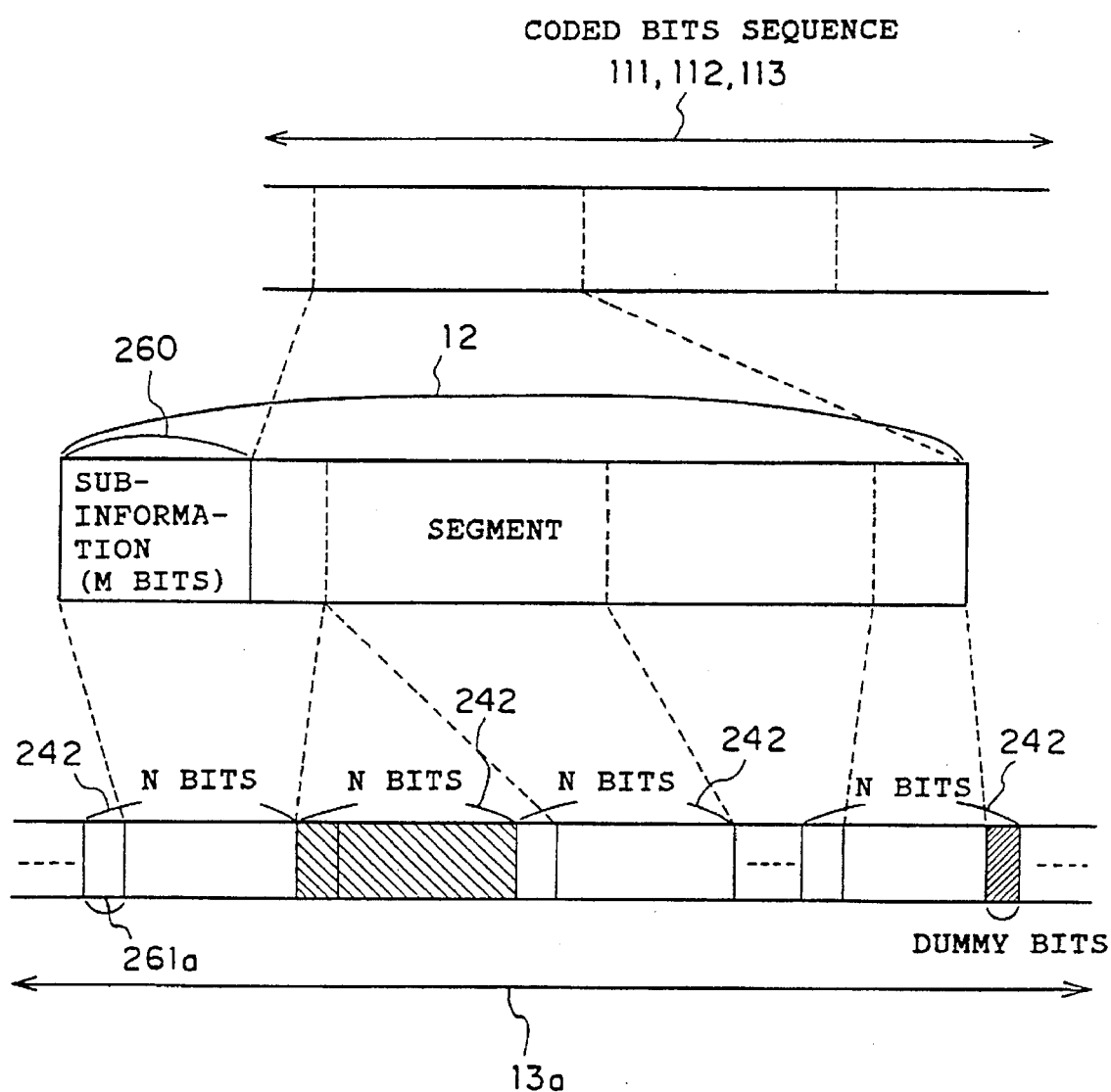
FIG. 3 is a view explaining an element packet and multiplexed stream.

FIG. 3 is a view explaining structures of an element packet 12, which element packet generating portions 10a, 10b and 10c generate, and multiplexed stream 13a, which a packet multiplexing section 2a generates. As shown in FIG. 3, the element packet 12 is composed of a segment portion in which information selected from coded bits sequence 111, 112 or 113 is provided, and additional information 260, which is generated in the element packet generating portion 10a. Additional information 261a generated in the packet generating portion 233 is contained in each packet data 242, which is output from the packet generating portion 233.

Figure 4:
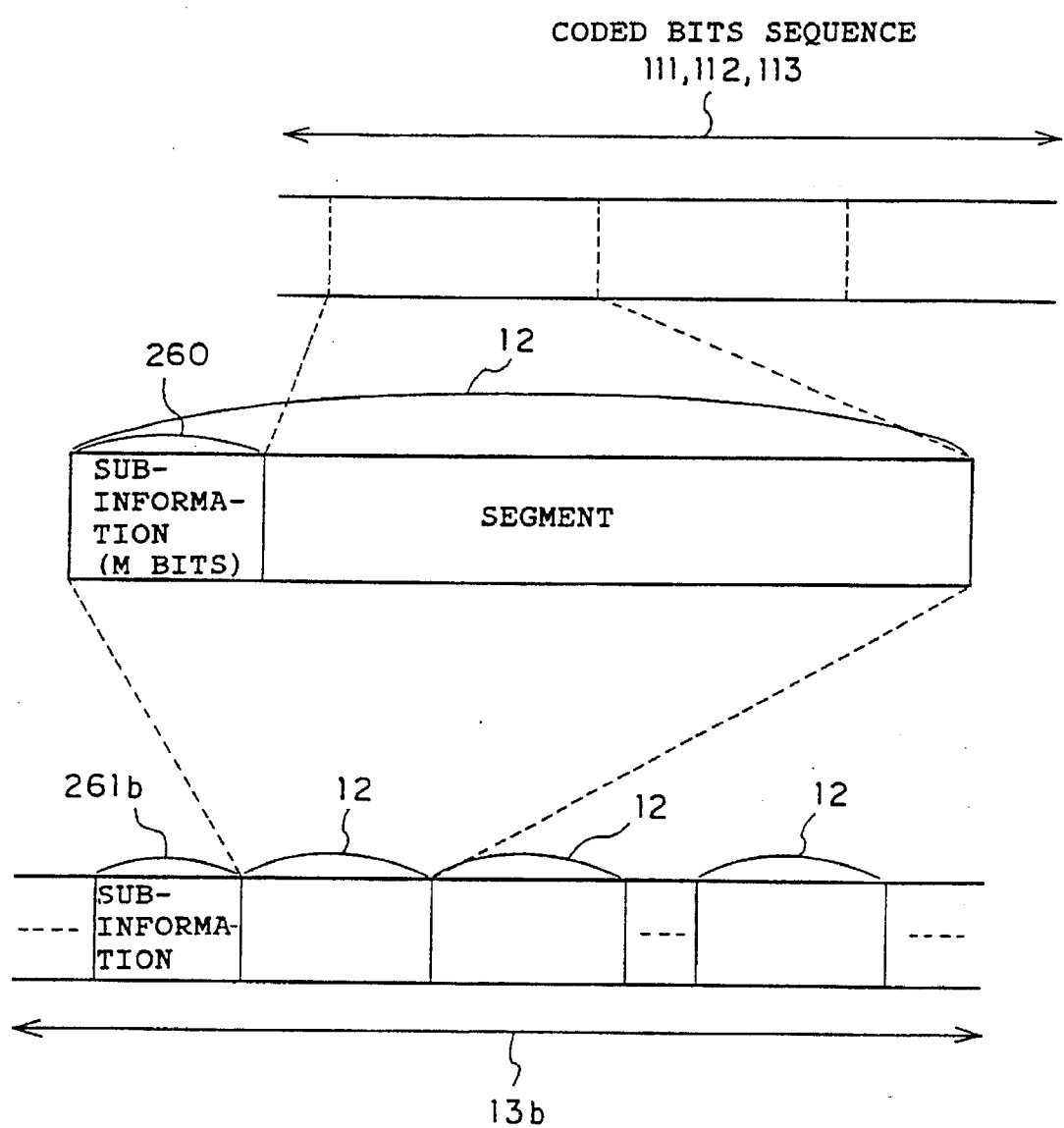
FIG. 4 is a view explaining an element packet and other multiplexed stream.

FIG. 4 is a view explaining structures of an element packet 12, which element packet generating portions 10a, 10b and 10c generate, and multiplexed stream 13b, which a packet multiplexing section 2b generates. Additional information 261 generated in the packet multiplexing section 2b is added to multiplexed stream 13b, which the packet multiplexing section 2b generates, by one with respect to one or plurality of element packets 12, as shown in FIG. 4.

The multiplexed stream 13a shown in FIG. 3 and the multiplexed stream 13b shown in FIG. 4 can be also used in Example 1 shown in FIG. 1.

Operations of the multimedia information processing system according to embodiment 2 will be described below. The element information selecting section 230 selects media information containing a video signal, an audio signal and a data signal from the corresponding media. As the selecting method, a method corresponding to applications which correspond to various media is used. For example, in the structure shown in FIG. 2, the element information selecting sections 230a, 230b and 230c input information relating to communication, information relating to broadcasting and information relating to computer respectively.

The element information selecting section 230a outputs the video signal 11a of media information relating to selected broadcasting to the video coding portion 9a of the information-source coding means 1a, and outputs the audio signal 11b to the audio coding portion 9b of the information-source coding means 1a, and then, outputs the data signal 11c to the data coding portion 9c of the information-source coding means 1a. The element information selecting section 230b outputs the video signal 11a of media information relating to selected communication to the video coding portion 9a of the information-source coding means 1b, and outputs the audio signal 11b to the audio coding portion 9b of the information-source coding means 1b, and then, outputs the data signal 11c to the data coding portion 9c of the information-source coding means 1b. The element information selecting section 230c outputs the video signal 11a of media information relating to selected broadcasting to the video coding portion 9a of the information-source coding means 1c, and outputs the audio signal 11b to the audio coding portion 9b of the information-source coding means 1c, and then, outputs the data signal 11c to the data coding portion 9c of the information-source coding means 1c.

Figure 17:
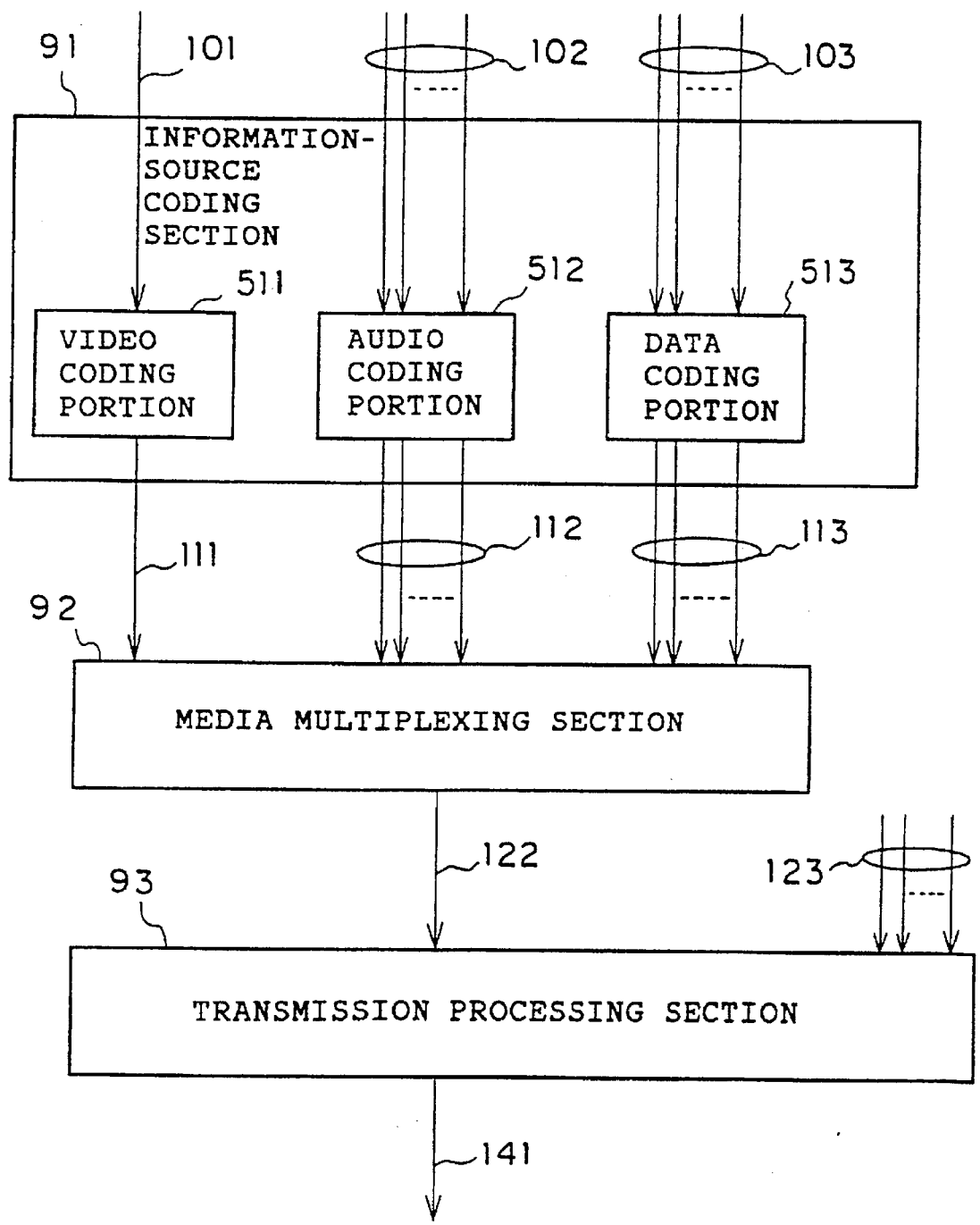
FIG. 17 is a block diagram showing a structure of a transmitter in a conventional multimedia information processing system.
Figure 18:
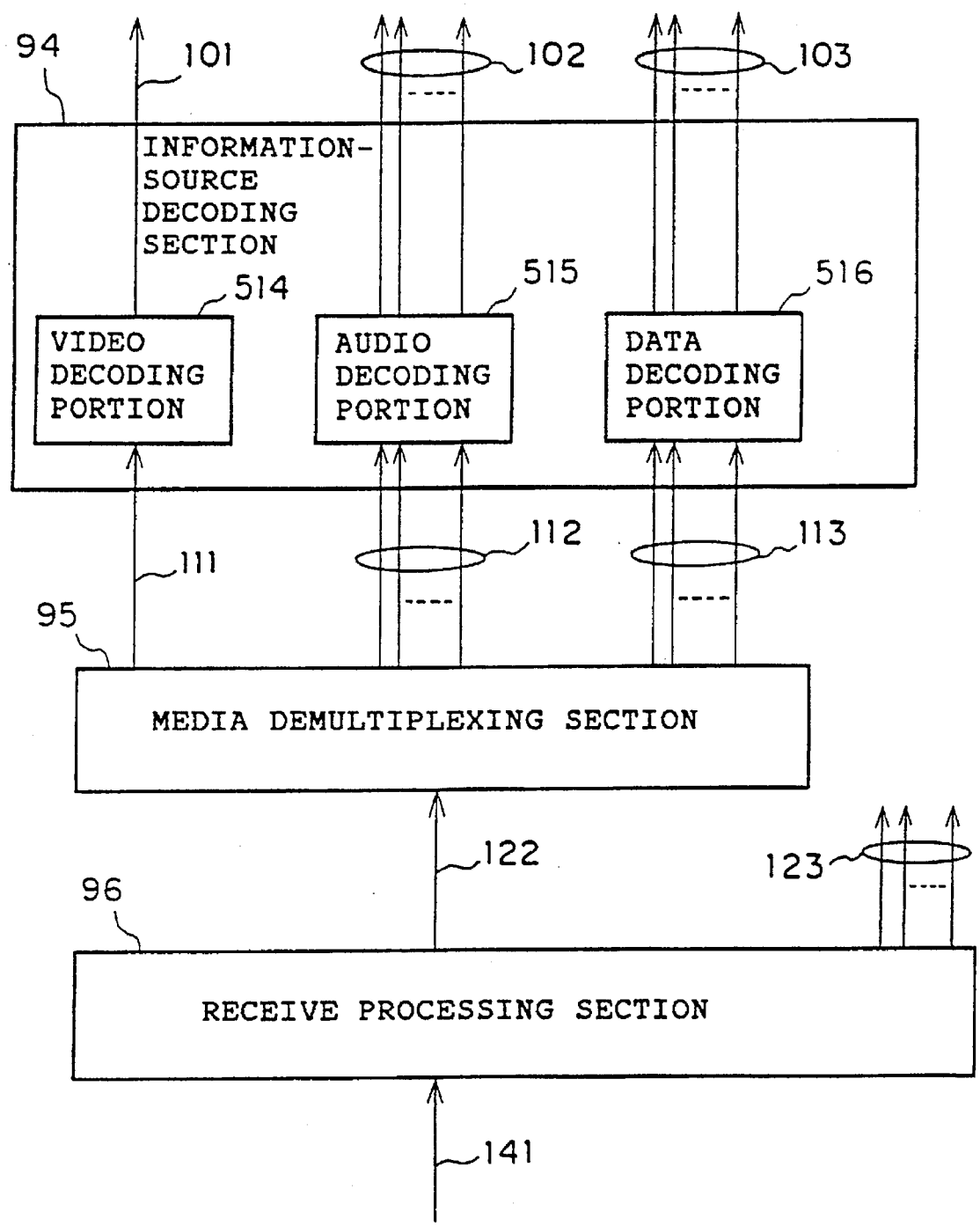
FIG. 18 is a block diagram showing a structure of a receiver in a conventional multimedia information processing system.
Figure 19:
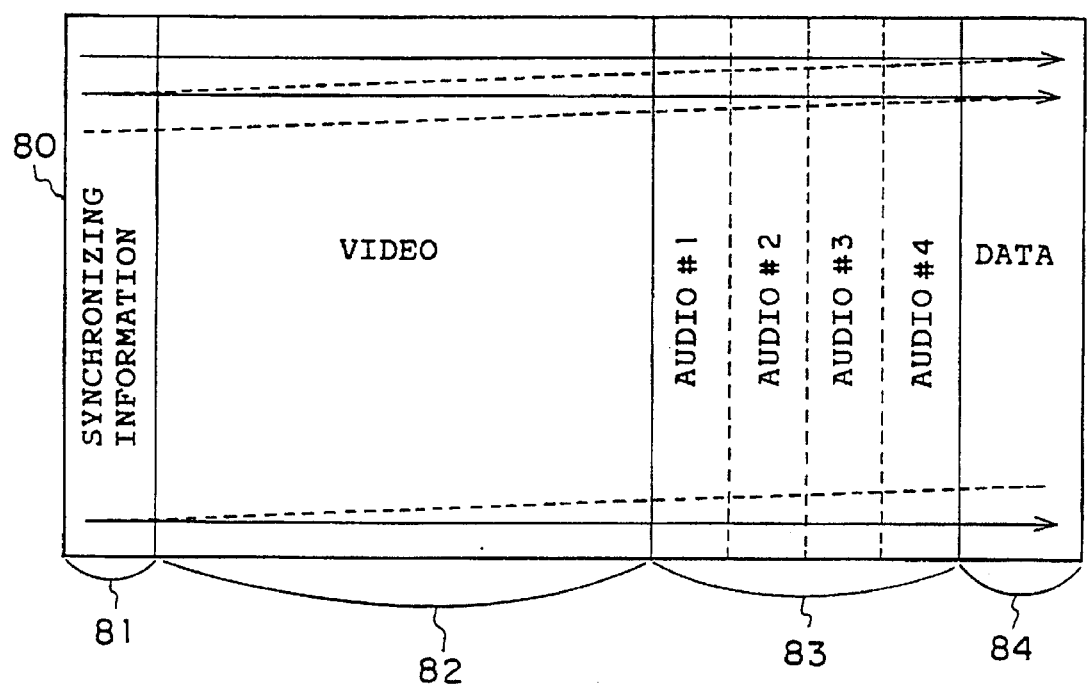
FIG. 19 is a view explaining a structure of a multiplexed frame in a multimedia information processing system.
Figure 20A:
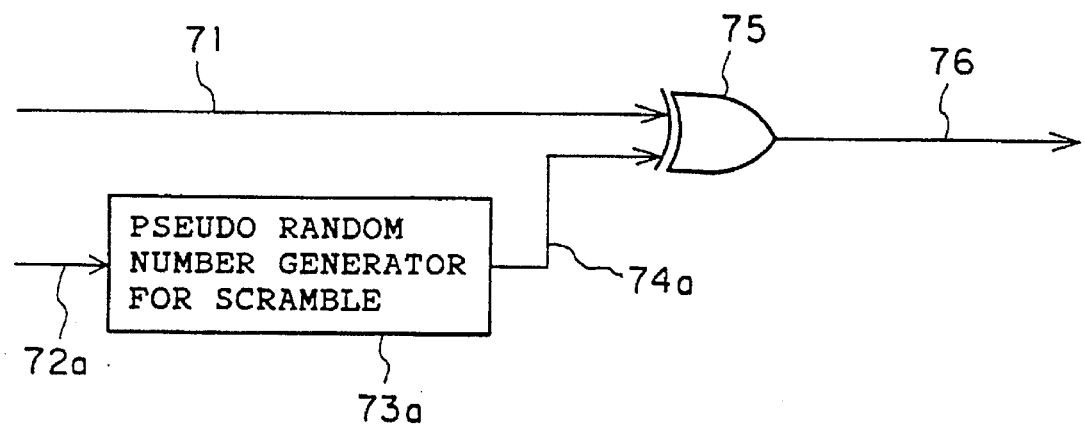
FIGS. 20(A) and 20(B) show a view explaining scramble processing in a multimedia information processing system.
Figure 20B:
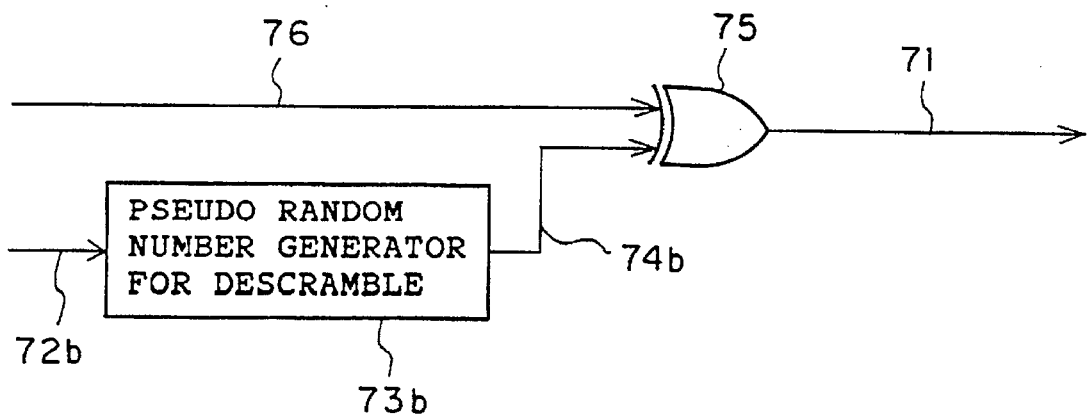
Figure 21:
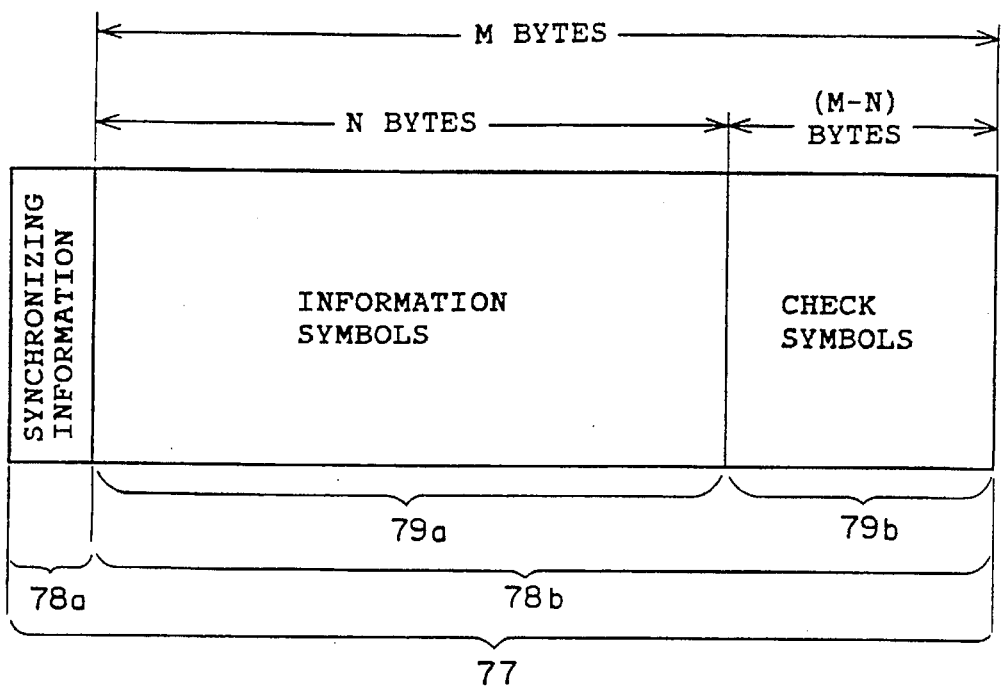
FIG. 21 is a block diagram showing a structure of an error correction frame when a Reed-Solomon code is used as an error correction code.
Figure 22:
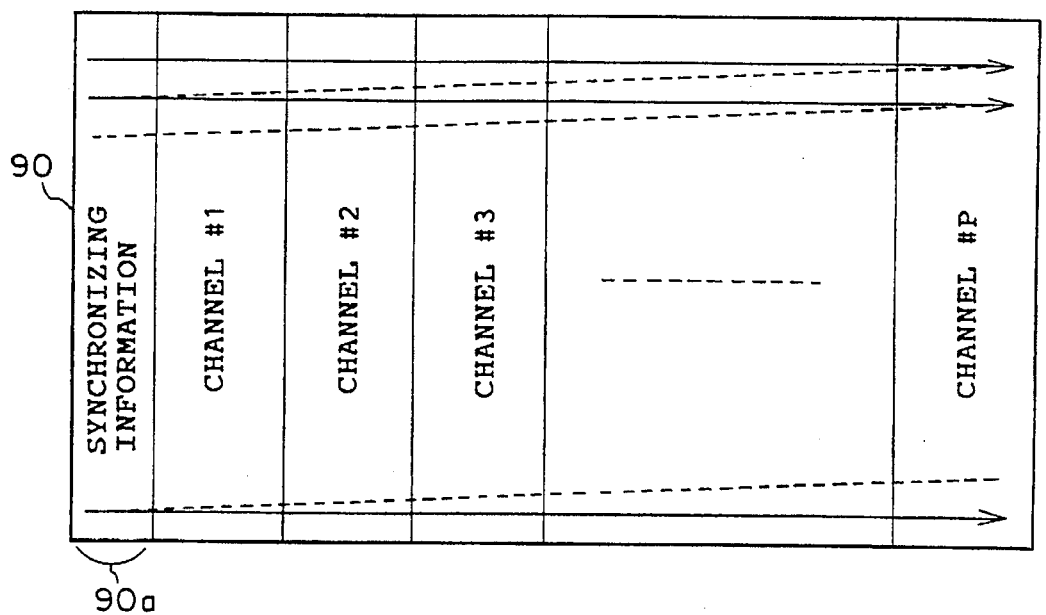
FIG. 22 is a view explaining a structure of a channel multiplexed frame in a multimedia information processing system.
Figure 23:
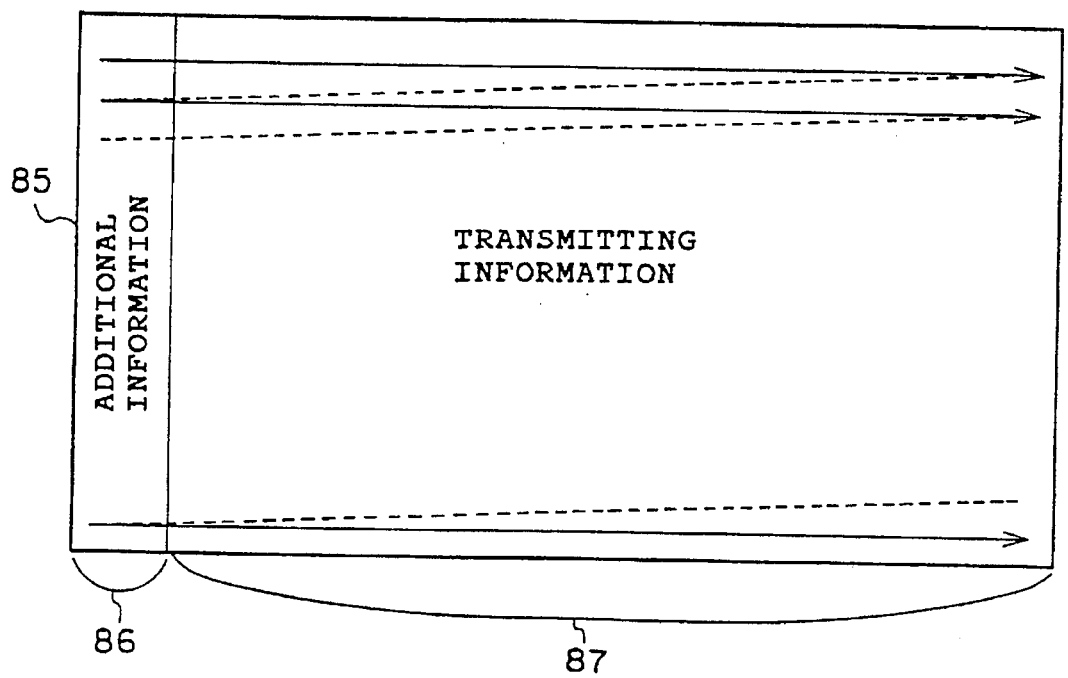
FIG. 23 is a view explaining a structure of a transmission frame in a multimedia information processing system.

In respective information-source coding sections 1a, 1b, and 1c, the video coding portion 9a, audio coding portion 9b and data coding section 9c operate in the same manner as the video coding portion 511, audio coding portion 512 and data coding section 513, shown in FIG. 17, for example.

In the respective information-source coding sections 1a, 1b and 1c, the element packet generating portion 10a inputs the video coded bits sequence 111, and divides the video coded bits sequence 111 into each segment of length in accordance with a predetermined frame length, a predetermined time or the like. The element packet generating portion 10a generates an element packet 12 in which additional information is added to a segment, as shown in FIG. 3. The additional information is used to execute media identification, packet synchronization and synchronization between respective elements which form media information. The element packet generating portion 10b inputs the audio coded bits sequence 112, and divides the audio coded bits sequence 112 into each segment of length in accordance with a predetermined frame length, a predetermined time or the like. The element packet generating portion 10b generates an element packet 12 in which additional information is added to a segment, as shown in FIG. 3. The additional information is used to execute media identification, packet synchronization and synchronization between respective elements which form media information. The element packet generating portion 10c inputs the data coded bits sequence 113, and divides the data coded bits sequence 113 into each segment of length in accordance with a predetermined frame length, a predetermined time or the like. The element packet generating portion 10c generates an element packet 12 by adding additional information 260 to a segment, as shown in FIG. 3. The additional information 260 is used to execute media identification, packet synchronization and synchronization between respective elements which form media information. Thus, the respective element packets 12 concerning elements (video, audio and data), which form information output from respective media are generated in accordance with respective media.

Each packet generating portion 233 divides the element packet 12 into each data of a predetermined length in the packet multiplexing section 2a. The packet generating portion 233 adds additional information 261a, such as media identification data, packet synchronizing code or the like, so that the receive side can select necessary data. Thus, a plurality of N bits fixed length packet data are generated, as shown in FIG. 3. When data is not filled with N bits, in spite of addition of additional information, dummy bits are further added to the data to generate N bits packet data. A packet multiplexing circuit 23a multiplexes each packet data 242 output from each packet generating portion 233, in accordance with each transmission media, and outputs each multiplexed stream 13a to the corresponding transmission processing section 3a, 3b, 3c or 3d.

The packet multiplexing section 2b collects one or more element packets 12 output from respective packet generating portions 10a, 10b and 10c, and adds one additional information 261b thereto to generate one packet data. The additional information 261b is substantially the same as the additional information 261a. The packet multiplexing section 2b then, multiplexes each packet data in accordance with each transmission media, and outputs each multiplexed stream 13b to the corresponding transmission processing section 3a, 3b, 3c or 3d.

In respective transmission processing portions 3a, 3b, 3c and 3d, the error correction processing portions 235a, 235b, 235c and 235d execute error correction coding for multiplexed stream 13a or multiplexed stream 13b output from the packet multiplexing section 2a or multiplexing section 2b respectively. In each transmission processing section 3a, 3b, 3c or 3d, multiplexed stream 13a or multiplexed stream 13b is selected in accordance with ability of a data receive side. Frame composing sections 236a, 236b, 236c and 236d converts data outputted by the error correction processing portions 235a, 235b, 235c and 235d respectively to formats corresponding to transmission media. Modulating portions 237a, 237b, 237c and 237d modulate data output from the frame composing sections 236a, 236b, 236c and 236d in a form suited to an electrical signal in the transmission media.

As described above, in each transmission processing section 3a, 3b, 3c or 3d, data conversion is executed in a form suited to the transmission line. Therefore, processing suited to a communication line in use, processing corresponding to the ground wave or satellite wave, processing suited to storage media in use, and processing suited to computer network in use can be attained.

When, for example, the transmission processing section 3d attains processing suited to the computer network, TCP (Transmission Control Protocol)/UDP (User DataGram Protocol)/XTP (Xpress Transport Protocol) processing is executed in the error correction portion 235d, and IP (Internet Protocol) processing is executed in the frame composing portion 236d. When the TCP is used, retransmission processing which is used in a case where an error occurred on transmission, thereby securing reliable transmission with no error. When reliability of the transmission line is high, UDP whose processing is easy is used. Further, when the same data is transmitted to a number of IP addresses at the same time, XTP is used. TC P/UDP/XTP and IP processing can be also executed in the data coding section 9c.

Embodiment 3

Figure 5:
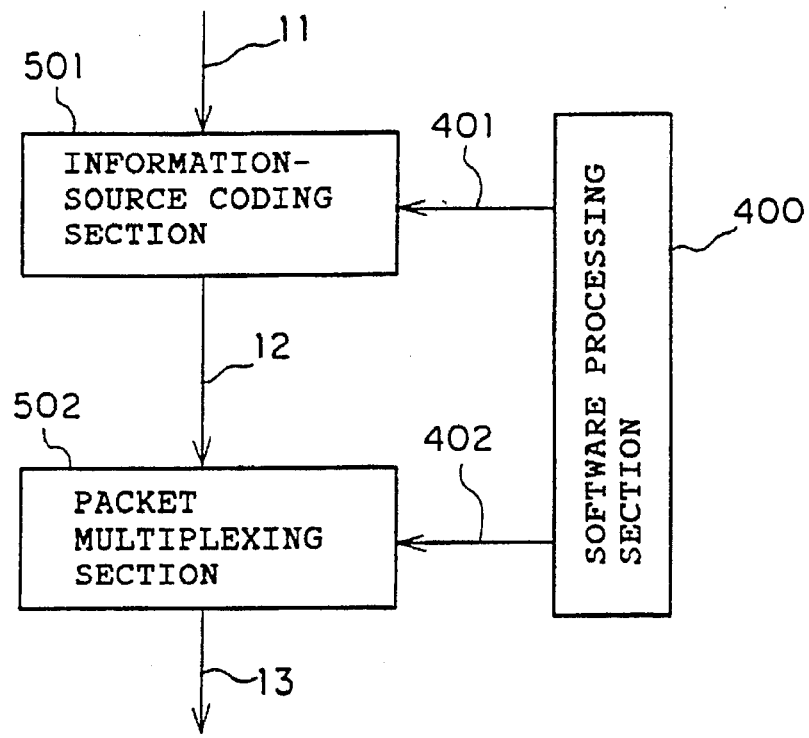
FIG. 5 is a block diagram showing a part of the structure of a transmitter in a multimedia information processing system according to the third embodiment of the present invention.

FIG. 5 is a block diagram showing another transmitter in a multimedia information system according to the present invention. In FIG. 5, reference numeral 400 denotes a software processing section in which an application program operates, 501 an information-source coding section, which changes processing contents in accordance with an operating mode instruction signal 401 output from the software processing section 400, and 502 a packet multiplexing section, which changes processing contents in accordance with an operation mode instruction signal 402 output from the software processing section 400.

As structures of the information-source coding section 501 and the packet multiplexing section 502, the structures of the information-source coding sections 1a, 1b and 1c and the structures of the packet multiplexing sections 2a, 2b and 2c can be applied. In this case, the information-source coding section 501 corresponds to the information-source coding section 1a, 1b or 1c, and the packet multiplexing section 502 corresponds to the packet multiplexing section 2a or 2b.

Operations of the transmitter will be described below. The software processing section 400 includes an edition/conversion application program, which outputs a parameter for coding in the information-source coding section 501, and a program organizing application program, which outputs kinds, contents or numbers of programs composed of video information, audio information and other data and so on, or information quantity or the like provided to each program.

The operating mode instruction signal 401 is outputted by the edition/conversion application program, so that an information-source coding section 501 generates the element packet 12. For example, when the information-source coding section 501 is composed in the same structure as the information-source coding sections 1a, 1b or 1c, and coding sections 9a and 9b are a video coding section and an audio coding section respectively, The operating mode instruction signal 401 contains parameters given to the coding section 9a, such as time-space resolution of video signals to be coded, coded algorithm, bit rate, coded qualities and so on, and parameters given to the coding section 9a, such as audio coded algorithm, sampling frequency, coded bit rate and so on.

The coding sections 9a and 9b in the information-source coding section 501 execute coding of input video signals and audio signals in accordance with the respective parameter, to generate the element packet 12.

In order for a packet multiplexing section 502 to generate multiplexed stream, the operating mode instruction signal 402 is outputted to the program organizing application program. The operating mode instruction signal 402 contains kinds, contents or numbers of programs, or information quantity given to each program and so on.

Programs are formed by combination of video information, audio information, and other data. The programs include various kinds, such as an usual television program composed of video information and stereo audio information, a text broadcasting program composed of only text data, and an audio program composed of only audio information or the like.

Further, in television programs, there are a program for the standard television with the aspect ratio of 4:3, and a program for EDTV, HDTV or the like, with the aspect ratio of 16:9, and format of revolution different from resolution of the standard television. Further, as program contents, there are various kinds, such as drama, sports, amusement, shopping and so on. The operating mode instruction signal 402 is set by a program organizing application program as those selecting information, and outputted to a packet multiplexing section 502.

The packet multiplexing section 502 prepares additional information from parameters contained in the operating mode instruction signal 402, to generate multiplexed stream 13 that is a packet sequence from the element packet 12 and additional information. According to such a structure, processing in the information-source coding section 501 and the packet multiplexing section 502 can be appropriately switched by means of an application program of the software processing section 400. Hence, a more interchangeable multimedia information processing system can be realized. Therefore, time-space resolution of video information, coded algorithm, bit rate, coded qualities and so on can be freely set by the edition/conversion application program, in accordance with output media information, and appropriate information-source coding depending upon circumstances can be executed.

Embodiment 4

Figure 6:
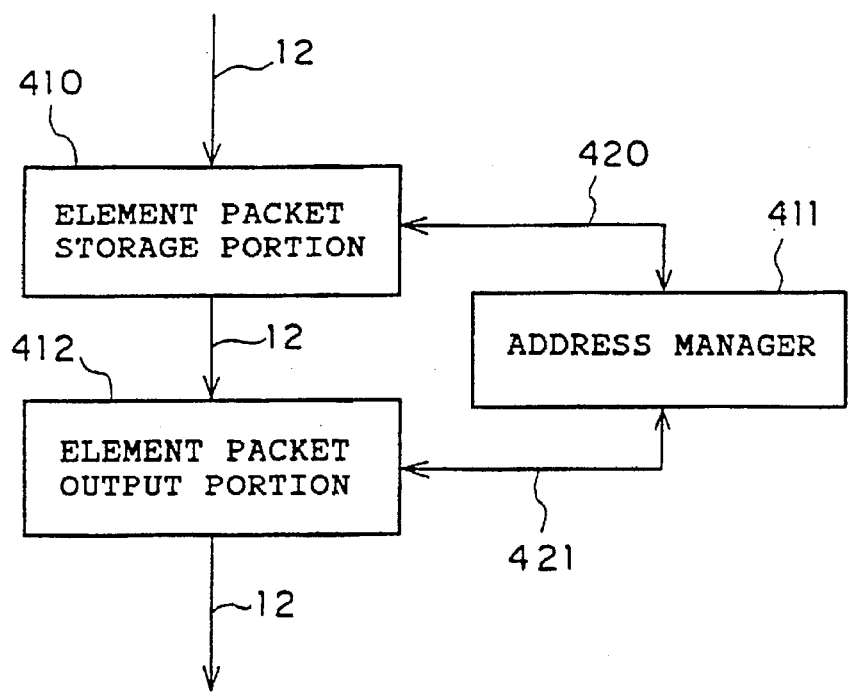
FIG. 6 is a block diagram showing a part of the structure of a transmitter in a multimedia information processing system according to the fourth embodiment of the present invention.

FIG. 6 is a block diagram showing a part of another transmitter in a multimedia information processing system according to the present invention. In FIG. 6, reference numeral 410 denotes an element packet storage portion, 411 an address manager, and 412 an element packet output portion. This structure is applied to the packet generating portion 233 shown in FIG. 2. Therefore, the whole structure of the multimedia information processing system reaches the structure shown in FIG. 2.

Operations of this system will be described below. An element packet 12 with a type of signal, which has interchangeability with other systems, is inputted to the packet multiplexing section from an information-source coding section. In the packet multiplexing section, each output element packet 12 is stored in the element packet storage portion 410 with the element packet as a unit. In this case, address information 420 that indicates which area (directory) of the element packet storage portion 410, the contents of the element packet 12 to be stored, i.e., information such as kinds of media and packet length etc., are recorded to is output to the address manager 411.

When the element packet 12 is read out from the element packet storage portion 410, A read-out address information 420 that indicates storage position of the element packet 12 is transmitted to the element packet storage portion 410. Output instruction 421 is outputted by the address manager 411 to the element packet output portion 412. The element packet storage portion 410 reads out the element packet 12 in accordance with the address information 420, and outputs to the element packet output portion 412. The element packet output portion 412 outputs the element packet 12 to the packet multiplexing section 2.

According to such a structure, the element packet 12 stored in the element packet storage portion 410 is selected in accordance with purposes, and can be output. Therefore, the order of the element packet 12 can be changed at non-actual time, and the order of programs can be easily changed with the element packet as a unit.

Embodiment 5

Figure 7:
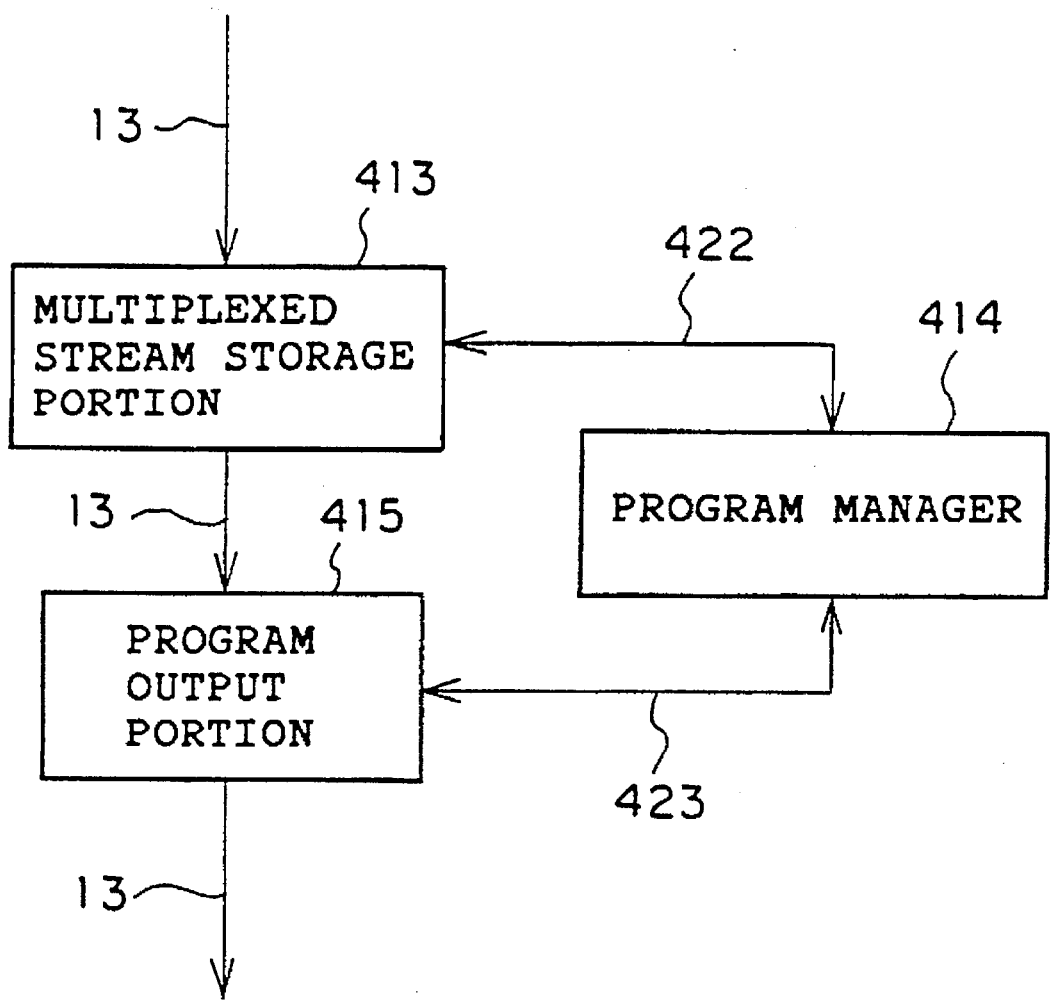
FIG. 7 is a block diagram showing a part of the structure of a transmitter in a multimedia information processing system according to the fifth embodiment of the present invention.

FIG. 7 is a block diagram showing a part of another transmitter in a multimedia information processing system according to the present invention. In FIG. 7, reference numeral 413 denotes a multiplexed stream storage portion, 414 a program manager that memorizes addresses in which the multiplexed stream 413 stores multiplexed stream 13, and 415 a program output portion that selects instructed multiplexed stream 13 to output. This structure can be also applied to the packet multiplexing section 2a or 2b shown in FIG. 2, for example. Therefore, the whole structure of the multimedia information processing system reaches the structure thereof shown in FIG. 2.

Operations of this system will be described below. Multiplexed stream 13 with the type of signal, which has interchangeability with other systems is stored in a multiplexed stream storage portion 413. In this case, address information 422 that indicates which area (directory) of the multiplexed stream storage portion 413, information such as program contents, and program capacity etc., was recorded to is outputted to a program manager 414.

When a program is output, read-out address information that indicates storage area of the multiplexed stream 13 is transmitted from the program manager 414 to the multiplexed stream storage portion 413. Program output instruction 423 is output to a program output portion 415. The multiplexed stream storage portion 413 outputs the multiplexed stream 13 from the read-out program output portion 415, in accordance with the address information 422. The program output portion 415 outputs the multiplexed stream 13 to the transmission processing section 3a, 3b, 3c or 3d.

According to such a structure, the multiplexed stream 13 stored in the multiplexed stream storage portion 413 is selected in accordance with purposes and can be output. Therefore, the order of the multiplexed stream 13 can be changed at non-actual time, and the order of programs can be easily changed with the multiplexed stream 13 as a unit.

Embodiment 6

Figure 8:
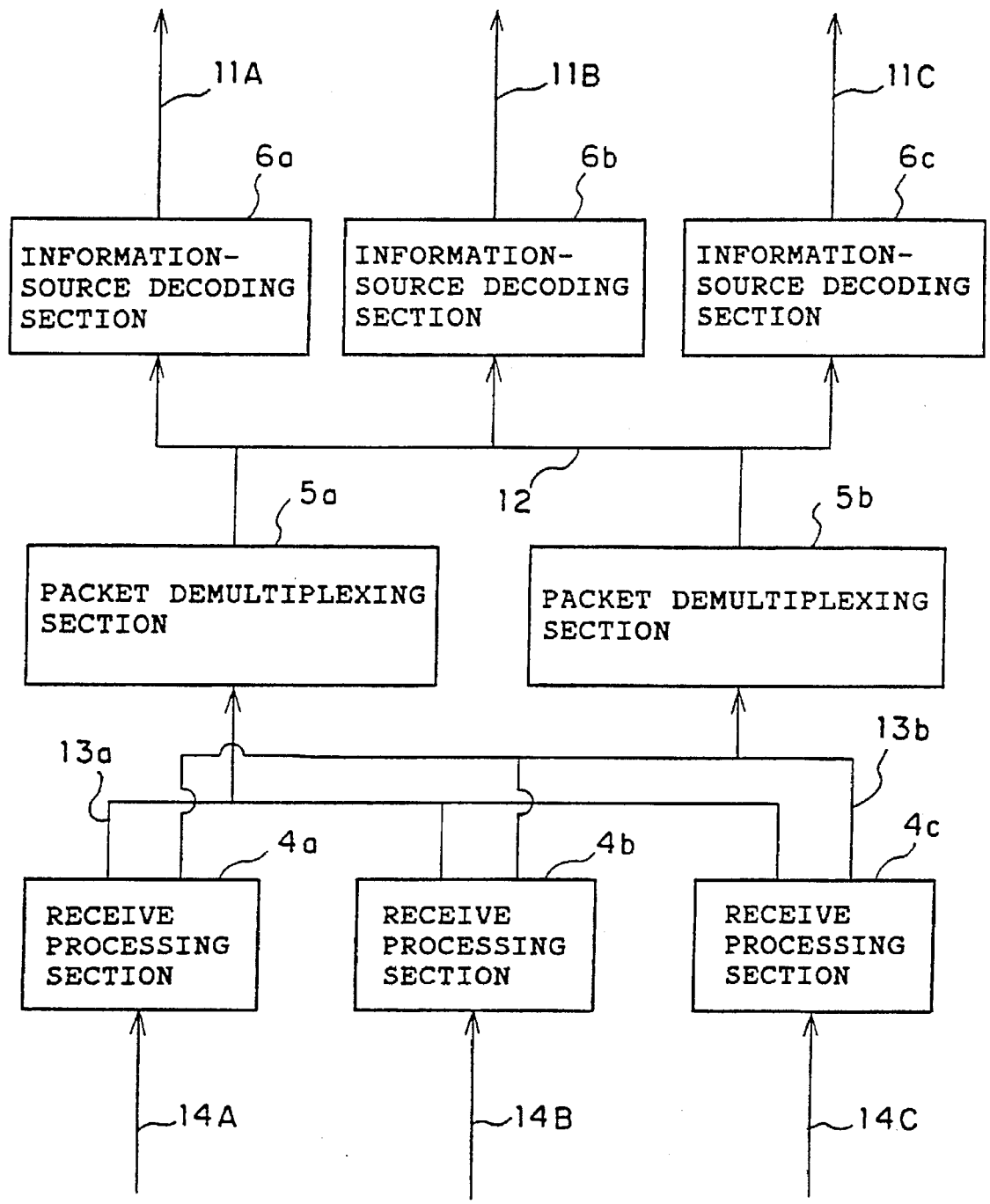
FIG. 8 is a block diagram showing a structure of a receiver in a multimedia information processing system according to the sixth embodiment of the present invention.

One embodiment of a receiver in a multimedia information processing system according to the present invention will be described below, with reference to drawing. FIG. 8 is a block diagram showing a receiver in a multimedia information processing system according to embodiment 6. reference numerals 4a, 4b and 4c denote receive processing sections, which receive transmission signals 14A, 14B and 14C and reproduce multiplexed stream 13a and 13b which do not contain error correction codes respectively, 5a and 5b packet demultiplexing sections, which reproduce an element packet 12 from multiplexed stream 13a and 13b respectively, and 6a, 6b and 6c information-source decoding sections, which reproduce the corresponding media information.

Operations of this system will be described. The receive processing sections 4a, 4b and 4c receive transmission signals 14A, 14B and 14C in accordance with various transmission media, such as cable transmission, satellite wave transmission, ground wave transmission or the like, and specifications of transmission media, to reproduce multiplexed stream 13a or 13b that is packet sequence. When a received transmission signal is based on the packet sequence shown in FIG. 3, multiplexed stream 13a is reproduced, and when a received transmission signal is based on the packet sequence shown in FIG. 4, multiplexed stream 13b is reproduced.

The packet demultiplexing section 5a demultiplexes packet data of fixed length, which is a component of multiplexed stream 13a, by using additional information for executing media identification, packet synchronization, establishing synchronization and so on, to obtain an element packet 12 for respective media.

FIG. 8 shows a receiver providing two packet demultiplexing sections, i.e., packet demultiplexing sections 5a and 5b. Nevertheless, even a receiver providing any one of the sections 5a and 5b can be used. In this case, only one type of multiplexed stream 13a or 13b can be operated.

The information-source decoding portions 6a, 6b and 6c input element packets 12 for respective media and detect packets by using additional information given to the element packets 12 respectively. Any one of information-source decoding section 6a, 6b and 6c, which should deal with the element packet 12 separates each element packet 12 to additional information 260 and segments, and connects segments concerning the same media to reproduce information-source coded bits sequence for the media. Further, by information-source decoding those coded bits sequence, media information 11A, 11B or 11C composed of a video signal, an audio signal, other data and so on is reproduced.

When various kinds of media information are reproduced with an output device such as display, speaker or the like, synchronization between media and presentation timing etc., are secured by the above-mentioned additional information 260.

According to such a structure, the receiver in the multimedia information processing system receives packet multiplexed transmission signal 14A, 14B or 14C, in accordance with specifications of transmission media, and classifies a processing sequence from regeneration of information-source coded bits sequence with media as a unit to information-source decoding. Thus, processing contents for each hierarchy is determined and further, input/output data in each grade processing is determined. Accordingly, data exchange between services, such as broadcasting, communication, storage in computer and so on can be easily attained. Namely, flexible services can be obtained. Additionally, hardware structure is simplified and additional functions can be easily added.

Embodiment 7

Figure 9:
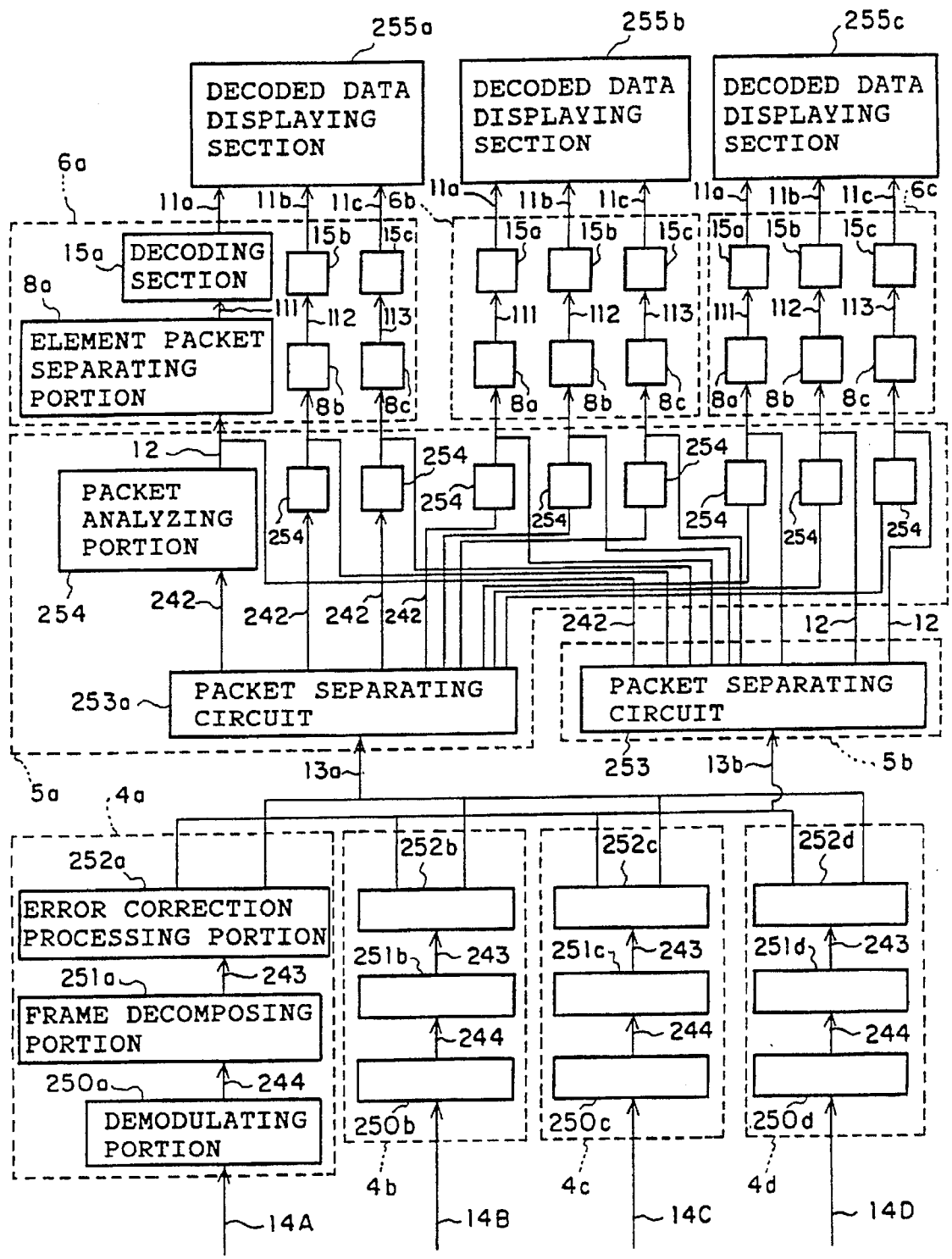
FIG. 9 is a block diagram showing a part of the structure of a receiver in a multimedia information processing system according to the seventh embodiment of the present invention.

FIG. 9 is a block diagram showing a receiver in a multimedia information processing system according to another embodiment of the present invention. As shown in FIG. 9, in this case, receive processing sections 4a, 4b, 4c and 4d which are provided in accordance with respective transmission media or storage medium contains demodulating portions 250a, 250b, 250c, and 250d, which receive transmission signals 14A, 14B, 14C and 14D, and reproduce frame composed data 244 respectively.

In the receive processing sections 4a, 4b, 4c and 4d, frame decomposing portions 251a, 251b, 251c and 251d extract code sequences 243 from the frame composed data 244. Error correction processing portions 252a, 252b, 252c and 252d reproduce multiplexed stream 13a or multiplexed stream 13b from the code sequence 243. The multiplexed stream 13a is inputted to a packet separating portion 5a and the multiplexed stream 13b is inputted to a packet separating portion 5b.

In the packet separating portion 5a, a packet separating circuit 253a separates the multiplexed stream 13a to packet data corresponding to the element information of each media information, and each packet analyzing portion 254 extracts the element packet 12 from input packet data 242. A packet separating portion 5b separates the multiplexed stream 13b to the packet 12 corresponding to the element information of each media information.

In each information-source decoding sections 6a, 6b or 6c, which is provided in accordance with respective media, element packet separating portions 8a, 8b and 8c reproduce element information from the input element packet 12. As element information, there are, for example, video information, audio information corresponding to the video information, and other information relating to the video information and the audio information. In this embodiments, a case where the element packet separating portion 8a relating to video information, the element packet separating portion 8b relating to audio information, and the element packet separating portion 8c relating to data information will be described. Therefore, in embodiment 7, coded bits sequence 111 of video information, coded bits sequence 112 of audio information, and coded bits sequence of other data are output from the element packet separating portions 8a, 8b and 8c respectively.

A video decoding portion 15a decodes the video coded bits sequence 111 to reproduce a video signal 11a. An audio decoding portion 15b decodes the audio coded bits sequence 112 to reproduce an audio signal 11b relating to the video signal 11a. A data coding portion 9c executes various processing to data coded bits sequence to reproduce a data signal 11c relating to the video signal 11a and/or the audio signal 11b.

The respective decoded data displaying sections 255a, 255b and 255c receives the video signal 11a, audio signal 11b and data signal 11c from the corresponding information-source decoding sections 6a, 6b and 6c, respectively, and displays image or outputs voice.

Operations of this system will be described below. Transmission signals 14A, 14B, 14C and 14D depending on transmission media or storage media are inputted to receive processing sections 4a, 4b, 4c and 4d. The input signals are converted to digital data 244 which do not depend on a transmission line, with receive demodulating portions 250a, 250b, 250c and 250d. Data 244 is decomposed to a frame with frame decomposing portions 251a, 251b, 251c and 251d. When the transmission error exists, the output of the frame decomposing portions 251a, 251b, 251c and 251d is corrected. Thus, multiplexed stream 13a and 13b with no error can be obtained. The receive processing section 4a, 4b, 4c or 4d is suitable for communication, broadcasting, storage, computer network or the like. If the receive processing section 4d is suitable for the computer network or the like, IP processing for the data output from a transmission line such as the internet protocol transmission line is executed and after TCP/UDP/XTP processing, packet multiplexed stream is obtained.

The multiplexed stream 13a or the multiplexed stream 13b outputted by the receive processing sections 4a, 4b, 4c or 4d is processed in a packet demultiplexing section 5a or a packet separating 5b. The multiplexed stream is processed in the packet demultiplexing section 5a. In the packet multiplexing section 5a, a packet separating circuit 253a separates only data that is needed on the receive side, from the multiplexed stream 13a, as shown in FIG. 3. Required packets are extracted, according to additional information 261a added to each packet. Further, a packet analyzing portion 254 excludes identifiers from separated packets 242 and extracts element packets 12.

The multiplexed stream 13b is processed in the packet demultiplexing section 5b. A packet separating circuit 253b in the packet demultiplexing section 5b extracts only data that is needed on the receive side, from the multiplexed stream 13b, as shown in FIG. 4. Required packets are extracted, according to additional information 261b added to each packet. Further, a packet analyzing portion 254 excludes identifiers from separated packets 242 and extracts element packets 12.

The element packets 12 are inputted to information-source processing sections 6a, 6b and 6c. In the information-source processing sections 6a, 6b and 6c, element packet separating portions 10a, 10b and 10c extract additional information 260 from each element packet 12 for each element information output from the packet demultiplexing 5a or the packet demultiplexing section 5b to obtain information-source coded data 111, 112, 113.

The coded data 111 reaches a decoded video signal through decoding by the decoding section 15a. The coded data 112 reaches a decoded audio signal through decoding by the decoding section 15b. The coded data 113 reaches data relating to the decoded video signal and the audio signal through decoding by the decoding section 15c.

The respective information-source processing sections 6a, 6b and 6b corresponding to respective media output the video signal, audio signal and other data to the corresponding to a decoded data displaying sections 255a, 255b and 255c. The decoded data displaying sections 255a, 255b and 255c establishes synchronization among element information, and executes displaying or the like. Since there is media information that does not contain video information and media information that does not contain video information and audio information, in such a case, information-source processing sections 6a and 6b do not execute the processing.

Embodiment 8

Figure 10:
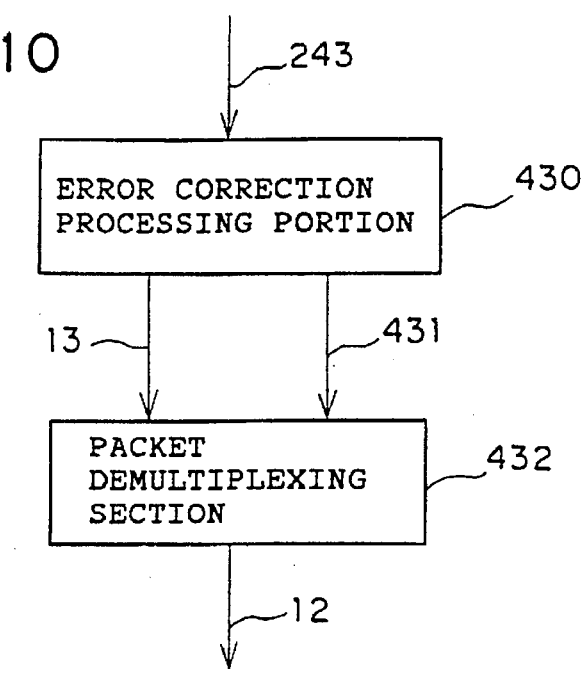
FIG. 10 is a block diagram showing a part of the structure of a receiver in a multimedia information processing system according to the eighth embodiment of the present invention.

FIG. 10 is a block diagram showing a part of a receiver providing an error correction processing portion 430 with error correction functions different from functions of the error correction processing portions 252a, 252b, 252c and 252d. Merely the error correction processing section 430 in the receive processing section 4a, 4b, 4c or 4d and a packet multiplexing section 432 provided in place of the packet multiplexing sections 5a and 5b are shown in FIG. 10, for simplification. Therefore, other structures are the same as the structures shown in FIG. 9.

Operations of this receiver will be described below. The error correction decoding section 430 inputs digital data 243 obtained in the frame decomposing portions 251a, 251b, 251c and 251d, i.e., the error correction frames. As in the correction processing portions 252a, 252b, 252c and 252d, synchronization of the error correction frame is established. After that, the bit or byte error in the error correction frame is corrected with check symbols to obtain multiplexed stream 13.

Further, when the number of errors exceeds correction ability of the error correction code, the error correction decoding section 430 outputs an error generating signal 431 indicating the fact that an error remains in the multiplexed stream 13 to the packet multiplexing section 432. The packet multiplexing section 432 processes an operation that separation of the element packet 12 with respect to error remained multiplexed stream 13 is not executed by the error generating signal 431.

According to such a structure, when the error generating signal 431 is input, the packet demultiplexing section 432 does not demultiplex the multiplexed stream 13. Consequently, generation of the decoding error or the regenerative error in the decoding processing sections 6a, 6b and 6c can be prevented.

In the error correction decoding section 430, multiplexed stream 13 in which data of an error remaining part have been replaced with dummy data whose values are all "1" may be outputted to the packet multiplexing section 432.

Embodiment 9

Figure 11:
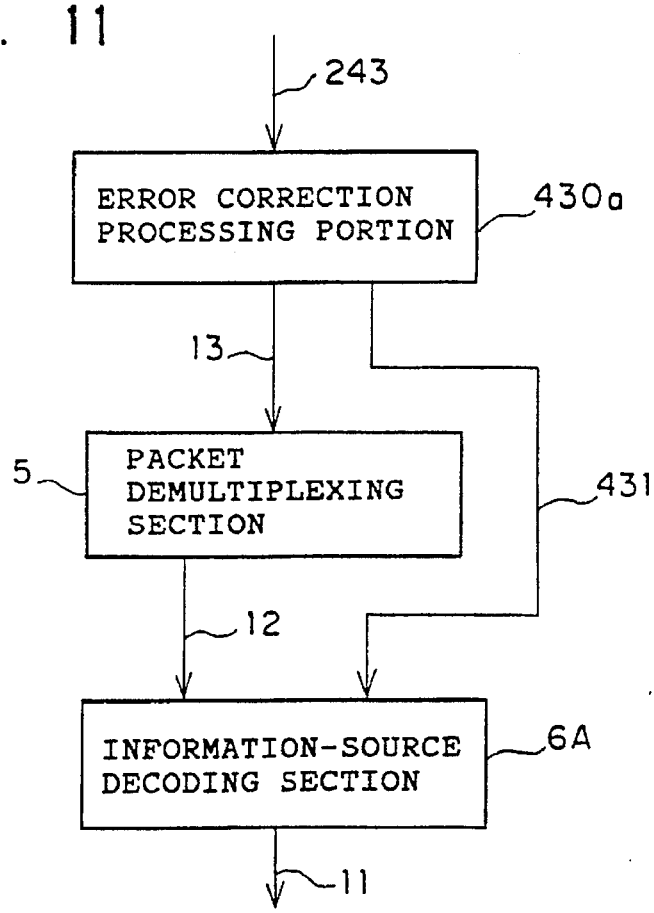
FIG. 11 is a block diagram showing a part of the structure of a receiver in a multimedia information processing system according to the ninth embodiment of the present invention.

FIG. 11 is a block diagram showing another embodiment of an error correction coding section 430 shown in FIG. 10. As shown in FIG. 11, in this case, an error correction processing portion 430a outputs also the error generating signal 431 to an information-source decoding section 6A. Merely the error correction processing section 430a in the receive processing section 4a, 4b, 4c or 4d, a packet multiplexing section 432 provided in place of the packet multiplexing sections 5a and 5b and an information-source decoding processing section 6A provided in place of the information-source decoding processing portion 6a, 6b or 6c are shown in FIG. 11, for simplification. Therefore, other structures are the same as the structures shown in FIG. 9. The information-source decoding processing section 6A is decoding stop function added information-source decoding processing sections 6a, 6b and 6c.

Operations of this system will be described below. The error correction decoding section 430a inputs digital data 243 obtained in the frame decomposing portions 251a, 251b, 251c and 251d, i.e., the error correction frame. As in the correction processing portions 252a, 252b, 252c and 252d, synchronization of the error correction frame is established. After that, the bit or byte error in the error correction frame is corrected with check symbols to obtain multiplexed stream 13.

Further, when the number of errors exceeds correction ability of the error correction code, the error correction decoding section 430a outputs an error generating signal 431 indicating the fact that an error remains in the multiplexed stream 13 to an information-source decoding processing section 6A. The information-source decoding processing section 6A stops decoding coded data contained in the element packet 12 indicating presence of an error with the error generating signal 431, and when the coded data has become normal, decoding is started. Thus, since decoding of the coded data in which presence of an error has been known is not executed, generation of the decoding error or regenerative error in decoding sections 15a, 15b and 15c is prevented. Additionally, separation of the decoding error and the transmission error can be executed, whereby the operation management of this system becomes easy.

Embodiment 10

Figure 12:
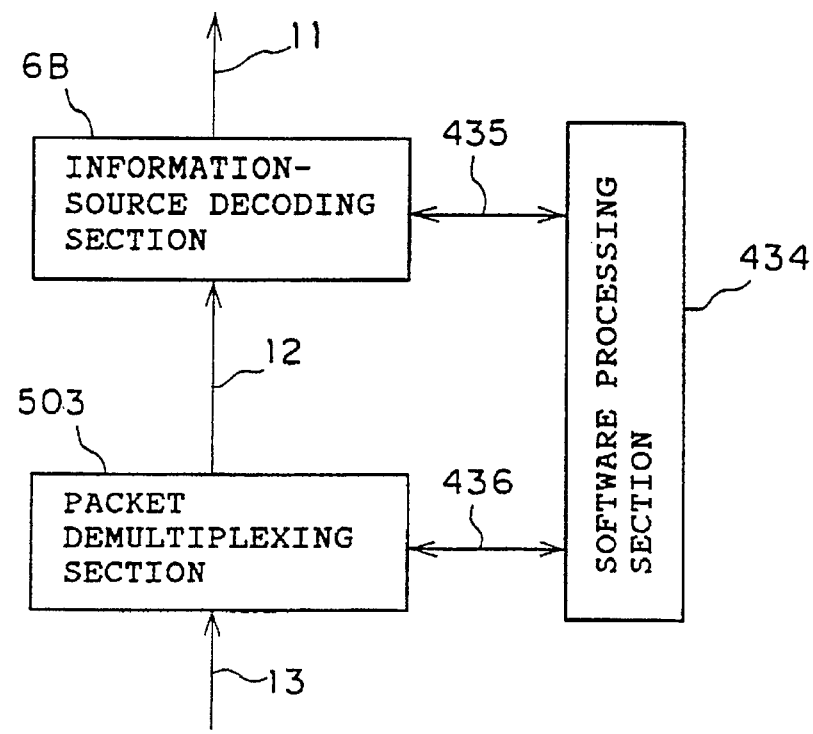
FIG. 12 is a block diagram showing a part of the structure of a receiver in a multimedia information processing system according to the tenth embodiment of the present invention.

FIG. 12 is a block diagram showing another receiver of a multimedia information processing system according to the present invention. In FIG. 12, reference numeral 434 denotes a software processing section in which an application program operates, 503 a packet demultiplexing section, which changes processing contents in accordance with a control signal 435 output from the software processing section 434, and 6B an information-source decoding section, which changes processing contents in accordance with a control signal 436 output from the software processing section 434.

As the structures of the information-source decoding section 6B and the packet demultiplexing section 503, the structures of the information-source decoding sections 6a, 6b and 6c, and the structures of the packet demultiplexing sections 5a and 5b can be applied. In this case, the information-source decoding section 6B corresponds to the information-source decoding section 6a, 6b or 6c, and the packet demultiplexing section 503 corresponds to the packet demultiplexing sections 5a and 5b.

Operations of this system will be described below. The application program in the software processing section 434 inputs/outputs the control signal 435 to or from the information-source decoding section 6B, and the control signal 436 to or from the packet demultiplexing section 503.

In this case, the packet demultiplexing section 503 sends information indicating each program which is composed of video information or audio information multiplexed in the multiplexed stream 13, to a program selecting (navigation) application program in the software processing section 434, as a control signal 436. On the other hand, the program selecting application program selects a program selected by instruction of user, according to information (program catalog) indicating each program received from the packet demultiplexing section 503. The program selecting application program gives the number of identifier or the like of the element packet required for composing selected programs, to the packet demultiplexing section 503, as a control signal 436. The packet demultiplexing section 503 extracts a necessary element packet 12 from the multiplexed stream 13.

On the other hand, when the information-source decoding section 6B reproduce video information, audio information and data etc., from each element packet 12, a coding application program of the software processing section 434 executes regeneration control. As the objects of regeneration control, there are high speed regeneration, slow regeneration, reverse regeneration and so on, and additionally, there are the number of channels for audio to be reproduced and selection of video resolution and so on. The information-source decoding section 6B reproduces information by a generating method instructed with the control signal 435, using the element packet 12 instructed with the control signal 435 output from decoding application program as an object.

According to such a structure, operations of the packet multiplexing section and the information-source decoding section can be appropriately switched, and a further interchangeable multimedia information processing system can be attained. Thus, user can select a required program with a program selecting application, thereby increasing utility and operability. Further, instruction of a special regeneration such as high speed regeneration or the like, or selection of the decoding method can be made, with a decoding application program, whereby further functions can be realized.

Embodiment 11

Figure 13:
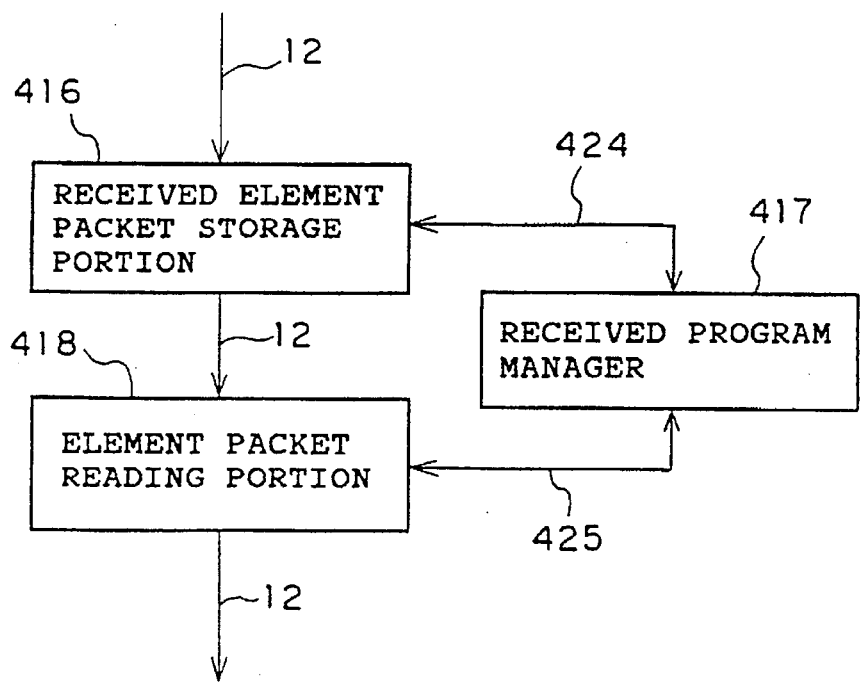
FIG. 13 is a block diagram showing a part of the structure of a receiver in a multimedia information processing system according to the eleventh embodiment of the present invention.

FIG. 13 is a block diagram showing another receiver of a multimedia information processing system according to the present invention. In FIG. 13, reference numeral 416 denotes a received element packet storage portion, 417 a received program manager, and 418 an element packet reading portion. This structure is also applied to the packet analyzing portion 254 shown in FIG. 9. Therefore, the whole structure of the multimedia information processing system reaches the structure shown in FIG. 9.

Operations of this system will be described below with reference to drawings. A reproduced element packet 12 is stored in a received element packet storage portion 416 with the element packet as a unit. In this case, contents of an element packet to be stored, i.e., address information 424 that indicates which area (directory) of the element packet storage portion 416, information such as media kinds or packet length or the like has been recorded in, is sent to a received program manager 417. When the element packet 12 is read out from the received element packet storage portion 416, the received program manager 417 provide the received element packet storage portion 416 with the reading address information 424 which indicates a storage position of an element packet. Further, the received program manager 417 outputs program reading instruction 425 to a received element packet reading portion 418. The received element packet storage portion 416 reads out the element packet in accordance with the address information 424, and outputs to the received element packet reading portion 418. The received element packet reading portion 418 outputs the element packet 12 to the information-source decoding sections 6a, 6b or 6c.

According to this structure, the order of the element packet 12 stored in the received element packet storage portion 416 can be easily changed and outputted. Therefore, when decoding or transmission at an actual time is not executed, and even when received contents cannot be observed immediately, no problem processing can be executed.

Embodiment 12

Figure 14:
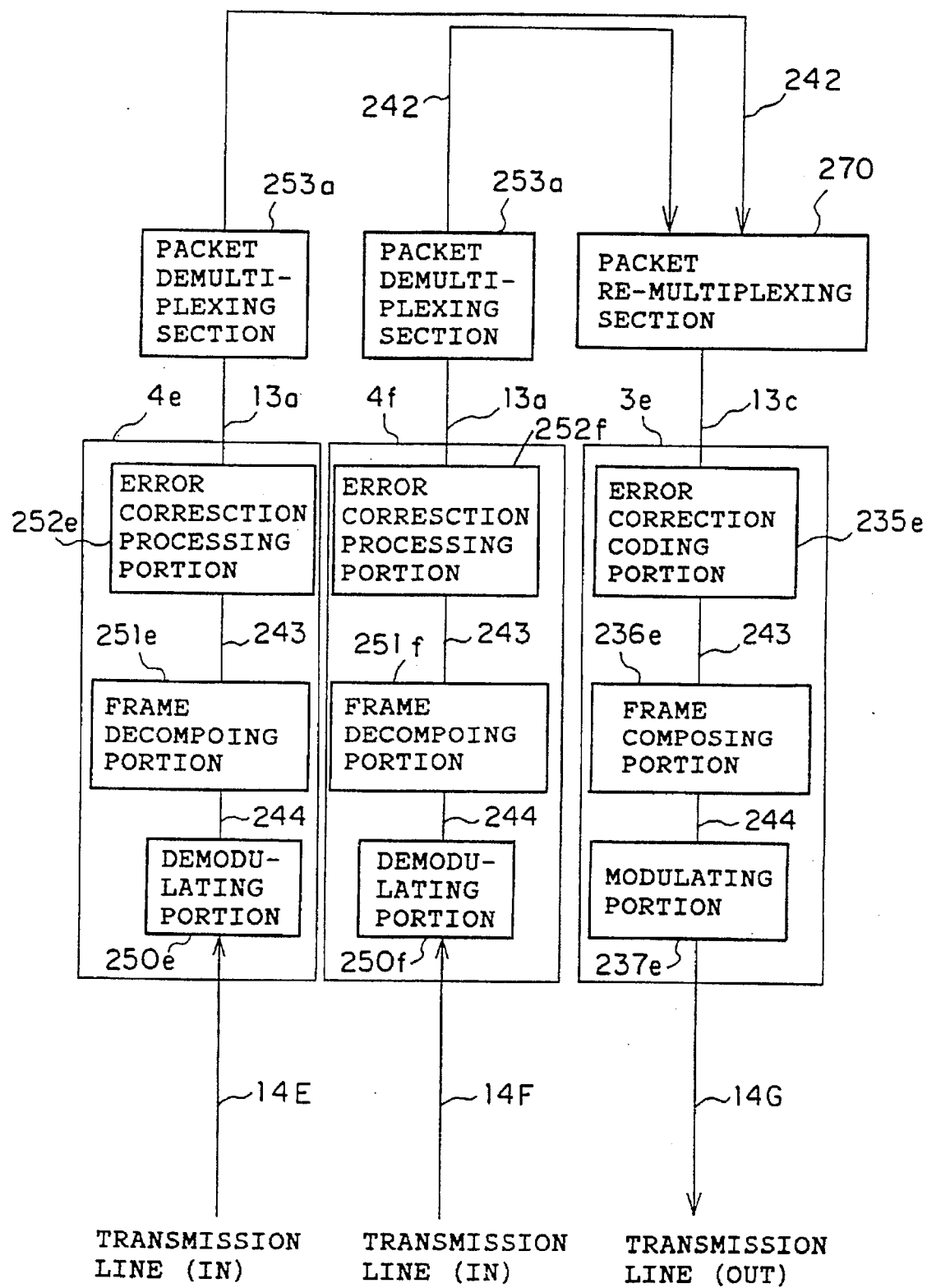
FIG. 14 is a block diagram showing a structure of a multimedia information processing system according to the twelfth embodiment of the present invention.

FIG. 14 is a block diagram showing a structure of a multimedia information processing system according to another embodiment of the present invention. As shown in FIG. 14, receive processing sections 4e and 4f respectively contain demodulating portions 250e and 250f, which receive transmission signals 14E and 14F to reproduce frame composed data 244. In the receive processing sections 4e and 4f, frame decomposing portions 251e and 251f extract code sequences 243 from the frame composed data 244. Error correction processing portions 252e and 252f reproduce multiplexed stream 13a from the code sequences 243. The multiplexed stream 13a is inputted to packet demultiplexing sections 253a and 253b. The packet data 242 outputted by the packet demultiplexing sections 253a and 253b is output to a packet re-multiplexing section 270.

A transmission processing section 3e contains an error correction coding portion 235e, which inputs multiplexed stream 13e output from the packet re-multiplexing section 270. In the transmission processing section 3e, the code sequences 243 prepared by the error correction coding portion 235e, frame composed in a frame composing portion 236e. The frame composed data 244 output from the frame composing section 236e is modulated with a modulating portion to reach a new transmission signal 14G.

Operations of this system will be described below. The transmission signals 14E and 14F inputted from two different transmission lines are input to receive processing sections 4E and 4F respectively. In the receive processing sections 4E and 4F, demodulating portions 250e and 250f demodulate the transmission signals 14E and 14F to digital data 244 that does not depend on the transmission line. Frame decomposing portions 251E and 251F execute format inversion to the data 244. When the respective data have errors, error correction portions 252E and 252F execute error correction processing to obtain multiplexed stream 13a with no errors. As described above, the multiplexed stream 13a is outputted by the receive processing sections 4e and 4f.

The multiplexed stream 13a outputted by the receive processing section 4e is decomposed into fixed length packet data 242 with the corresponding packet demultiplexing section 253a. The multiplexed stream 13a outputted by other receive processing section 4f is decomposed into fixed length packet data 242 with the corresponding packet demultiplexing section 253a. The packet re-multiplexing section 270 inputs both packet data 242, and re-allocates additional information such as the identifier or the like thereto to generate new one multiplexed stream 13c. The multiplexed stream 13c is outputted to a transmission processing section 3e.

In the transmission processing section 3e, an error correction processing portion 235g executes error correction processing to a multiplexed stream 13c outputted by the packet re-multiplexing section 270. The frame decomposing portion 236e converts the output of the error correction processing portion 235g to a form suited to the transmission line. A modulating portion 237e modulates the output of the frame decomposing portion 236e to a form suited to the electrical properties of the transmission line. The modulated wave is output to a transmission line as a new transmission signal.

According to such a structure, the packet sequence output from a plurality of transmission lines can be outputted to other transmission line, as a new there is not a transmission signal 14F, which is inputted from a transmission line, or when the transmission capacity is less than the input, the packet re-multiplexing section 270 selects the element packet 12 and execute speed matching so as to match the transmission capacity of the transmission line on the output side, and controls the transmission signal 14G so as to output to a transmission line.

Embodiment 13

Figure 15:
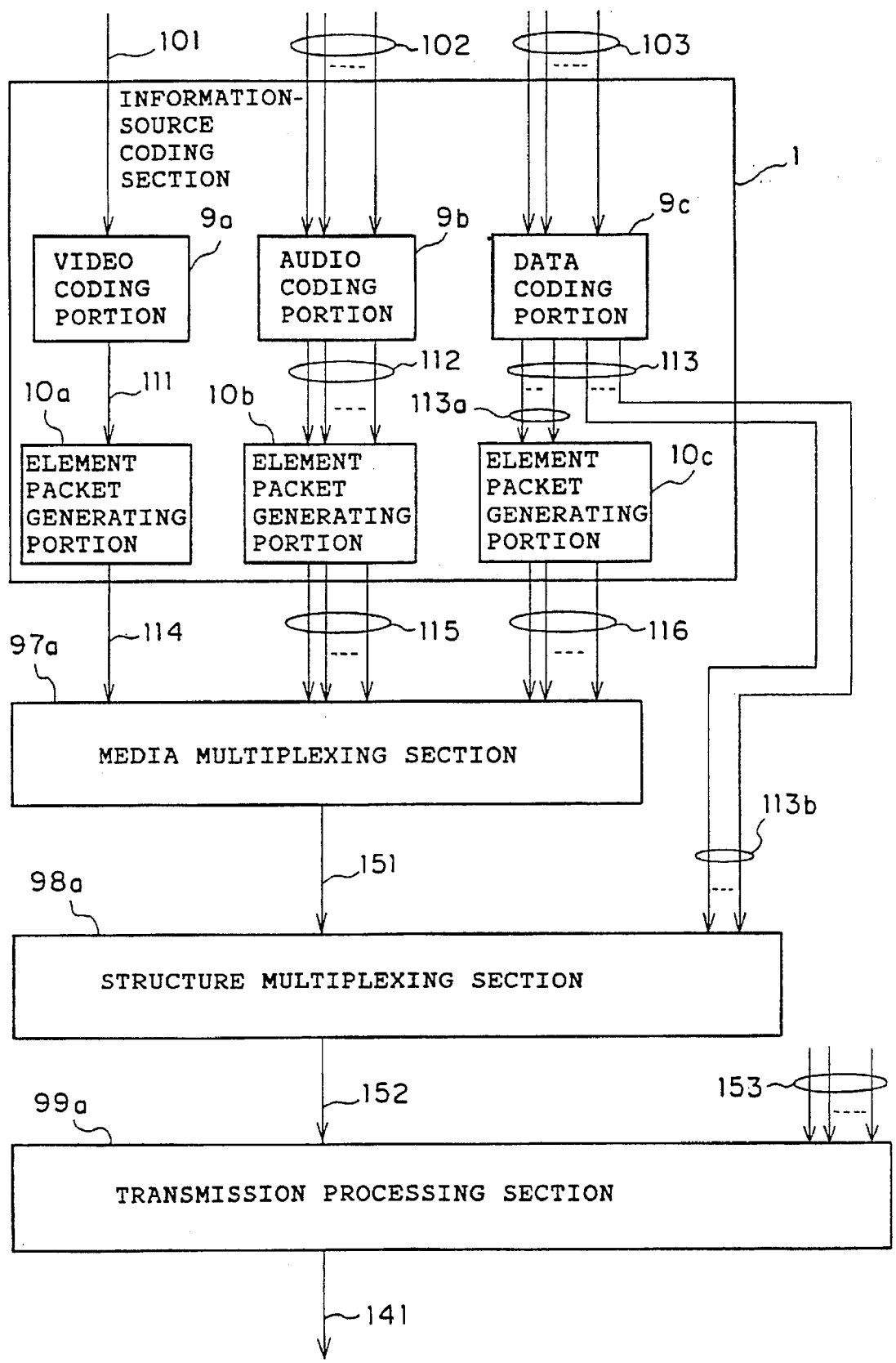
FIG. 15 is a block diagram showing a structure of a transmitter in a multimedia information processing system according to the thirteenth embodiment of the present invention.

FIG. 15 is a block diagram of a structure of a transmitter in a multimedia information processing system according to another embodiment of the present invention.

In FIG. 15, reference numeral 1 denotes an information-source coding section composed of a video coding section 9a, an audio coding section 9b, a data coding section 9c, and element packet generating portions 10a, 10b and 10c. In the information-source coding section 1, the video coding section 9a information-source executes coding of a video signal 101, to generate video coded bits sequence 111, the audio coding section 9b executes information-source coding of one or more audio signals 102 relating to the video signal 101, to generate one or more audio coded bits sequences 112, and the data coding section 9c executes various processing for a data signal 103 relating to the video signal 101 or the audio signal 102, to generate data coded bits sequence. The element packet generating portions 10a, 10b and 10c generate element packet sequence 114, 115 and 116 from the data coded bits sequence 113a.

Reference numeral 97a denotes a media multiplexing section, which inputs the element packet sequence 114, 115 and 116, and executes multiplexing with packet as a unit, to generate multiplexed bits sequence 151. Reference numeral 98a denotes a structure multiplexing section, which multiplexes the multiplexed bits sequence 151 and information 113b that is needed immediately on the receive side, such as control information.

Reference numeral 99a denotes a transmission processing section, which provides multiplexed bits sequence 152 with scramble processing and an error correction code, and executes channel multiplexing with the multiplexed bits sequence and one or more other multiplexed bits sequence 153 containing video information, audio information relating thereto and data information and executes frame composing and modulating etc., to generate a transmission signal.

Operations of this system will be described below. An information-source coding section 1 reduces redundant components of various signals and generates packets by using various coding method. Namely, the video coding section 9a executes information-source coding with respect to the video signal 101, to generate video coded bits sequence 111. The audio coding section 9b executes information-source coding with respect to the one or more audio signals 102, to generate one or more coded bits sequences 112. The data coding section 9c executes information-source coding and conversion of data structure with respect to the data signal 103 containing a synchronizing signal with the video signal and the audio signal, and a control signal, to generate data coded bits sequence 113.

The element packet generating portions 10a, 10b and 10c generate element packet sequence 114, 115 and 116 from the input video coded bits sequence 111, audio coded bits sequence 112 and data coded bits sequence 113a. The element packet sequence 114, 115 and 116 are generated by dividing coded bits sequence into segments according to predetermined frame length or predetermined time or the like, and providing each segment with additional information for executing media identification, packet synchronization, and establishing synchronization etc., as shown in FIG. 3, for example. The element packet sequence 114, 115 or 116 has the type of signal with interchangeability with other systems, and is generated in accordance with media. Among the data coded sequence 113 outputted by the element packet generating portion 10c, information that is needed immediately on the receive side, such as control information, instruction information or clock information or the like is given to a structure multiplexing section 98a as data coded bits sequence 113b.

The media multiplexing section 97a inputs the element packet sequence 114, 115 and 116 corresponding to media, generated in the information-source coding section 1, and executes packet multiplexing to generate multiplexed packet sequence 151. The structure and operation of the media multiplexing section 97a in embodiment 13 is the same as the structure and operation of the packet multiplexing section 2a and packet multiplexing section 2b. The structure multiplexing section 98a structure multiplexes the data coded bits sequence 113b with the multiplexed packet sequence 151 to generate multiplexed bits sequence 152.

A transmission processing section 99a executes scramble processing for the multiplexed bits sequence 152, error correction coding for the multiplexed bits sequence 152, channel multiplexing processing for multiplexed bits sequence 152 and one or more other multiplexed bits sequence 153, frame composing processing and modulating etc., in accordance with the kinds and characteristics of transmission lines and applications, to generate a transmission signal 141.

According to such a structure of the transmitter in the multimedia information processing system in embodiment 13, multiplexing the media information is executed with a packet as a unit. Consequently, multiplexing can be effectively executed in flexible accordance with the change in the transmission speed of each media information to be multiplexed, and the presence or absence of media information to be transmitted. Further, since structure multiplexing with multiplexed packet sequence is executed without multiplexing information that is needed immediately on the receive side, the receiver can separate immediately and easily information required before separation of the multiplexed packet sequence.

Embodiment 14

Figure 16:
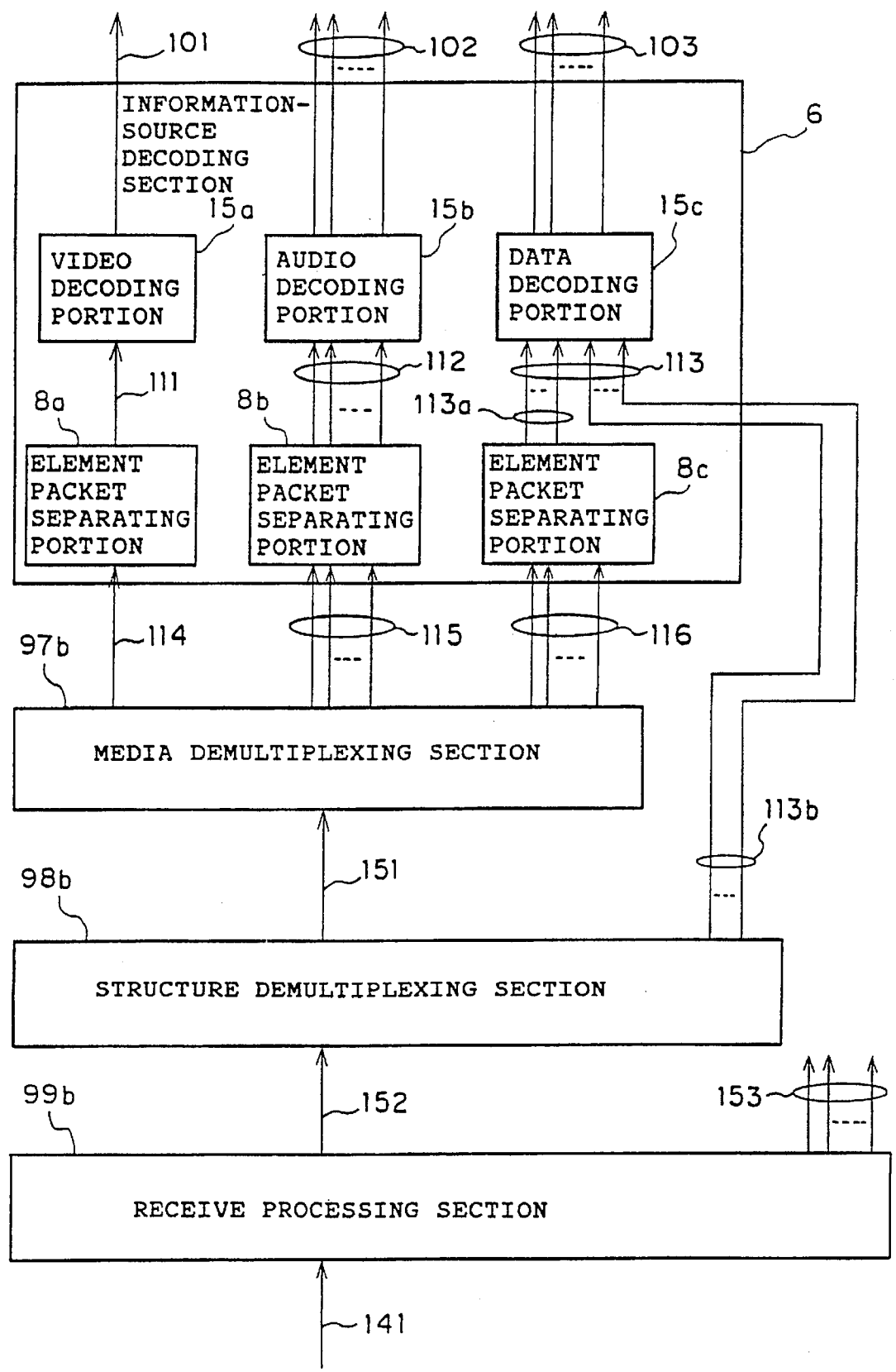
FIG. 16 is a block diagram showing a structure of a receiver in a multimedia information processing system according to the fourteenth embodiment of the present invention.

FIG. 16 is a block diagram showing a receiver in a multimedia information processing system according to another embodiment of the present invention.

In FIG. 16, reference numeral 99b denotes a receive processing section, which receives a transmission signal 141, executes demodulation, synchronization of transmission frame, and reproduction of transmission frame and demultiplexes the channel multiplexing signal, to select special channel signal. The receive processing section 99b further executes error detecting and correcting, and descrambling, to reproduce the multiplexed bits sequence 152 or one or more other multiplexed bits sequence 153.

The structure demultiplexing section 98b demultiplexes the multiplexed bits sequence 152 into data coded bits sequence 113b and multiplexed packet sequence 151. The media demultiplexing section 97b demultiplexes the multiplexed bits sequence 151 into video coded bits sequence 111, one or more audio coded bits sequences 112 and one or more data coded bits sequences 113.

The information-source decoding section 6 inputs video coded bits sequence 111, audio coded bits sequence 112 and data coded bits sequence 113, and outputs video coded bits sequence 101, audio coded bits sequence 102 and data coded bits sequence 103. In the information-source decoding section 6, the video decoding section 15a executes information-source decoding of the video coded bits sequence 111 to reproduce the video signal 101. The audio decoding section 15b executes information-source decoding of the one or more audio coded bits sequence 112 to reproduce one or more audio signals 102 relating to the video signal 101. The data decoding section 15c executes reverse processing for the one or more data coded bits sequences 113, to reproduce one or more data signals 103 relating to the video signal 101 and/or the audio signal 102.

Operations of this system will be described below. The receiver operates reversely to the operation of the transmitter shown in FIG. 15. The receive processing section 99b demodulates a received transmission signal 141, and further executes synchronization and reproduction of the transmission frame, channel multiplexing, error detection and correction, descrambling and so on for the demodulated signal, to reproduce one or more other channel multiplexed bits sequence 153 and the present channel multiplexed bits sequence 152.

A structure demultiplexing section 98b executes structure demultiplexing of the multiplexed bits sequence 152, to reproduce the multiplexed packet sequence 151 and information 113b, which is immediately needed on the receive side, such as control information, instruction information, and clock information etc.. The information 113b, which is immediately needed on the receive side is immediately used through the data decoding section 15c that is described later.

A media demultiplexing section 97b demultiplexes the multiplexed packet sequence 151 to reproduce the element packet sequence 114, 115 or 116 corresponding to media. The structure and operation of demultiplexing section 97b is the same as the structure and operation of the packet demultiplexing section 5a or the packet demultiplexing section 5b shown in FIG. 9.

In the information-source decoding section 6, an element packet decomposing section 8a inputs the element packet sequence 114 concerning video information, separates respective element packets into additional information and segments by using additional information given to each element packet, and reproduces video coded bits sequence 111 by connecting the respective segments to each other. An element packet decomposing section 8b inputs the one or more element packet sequences 115 concerning audio information, separates respective element packets into additional information and segments by using additional information given to each element packet, and reproduces audio coded bits sequence 112 by connecting the respective segments to each other. An element packet decomposing section 8c inputs the element packet sequence 116 concerning other data, separates respective element packets into additional information and segments by using additional information given to each element packet, and reproduce video coded bits sequence 113a by connecting the respective segments to each other.

A video decoding section 15a executes information-source decoding for the reproduced video coded bits sequence 111, and restores a video signal 101. An audio decoding section 15b executes information-source decoding for the reproduced audio coded bits sequence 112, and restores one or more audio signals 102. A data decoding section 15c executes information-source decoding or various reverse processing for the data coded bits sequence 113b inputted from the reproduced data coded bits sequence 113a and the structure demultiplexing section 98b and restores one or more data signals 103.

As described above, the receiver in the multimedia information processing system according to embodiment 14 demultiplexes information which is required for the information-source decoding section 6, from a structure multiplexed frame, before demultiplexing the multiplexed packet sequence. Accordingly, a quick response to a command or the like output from the transmitter can be made.

What is claimed is:

1. A multimedia information processing system executing transmission and/or storage of multimedia information from a respective media unit, the system comprising:

information-source coding means for inputting media information, coding the media information from the respective media unit, adding sub-information pertaining to media identification, packet synchronization and synchronization between elements that form the media information, and generating element packets constructed in signal forms that have interchangeability with other systems;

packet multiplexing means for executing speed matching and multiplexing of the element packets for the respective media unit which said information-source coding means outputs, and generating multiplexed streams in signal forms that have interchangeability between systems; and transmitting processing means for converting said multiplexed streams in accordance with transmission media and/or storage media and outputting transmission signals.

2. A multimedia information processing system according to claim 1, further comprising:

element media selecting means for editing the media information into element media information; and wherein said information-source coding means comprises:

coding means for reducing the amount of said element media information; and element packet generating means for inputting the output of said coding means to generate element packets.

3. A multimedia information processing system according to claim 1, wherein said packet multiplexing means comprises:

packet generating means for adding additional information to the element packets for media identification corresponding to the media information, and synchronization information for packet reproduction; and packet multiplexing means for executing speed matching for the element packets and for, generating multiplexed streams.

4. A multimedia information processing system according to claim 1, wherein said transmitting processing means comprises:

error correction coding means for correcting errors in accordance with transmission media or storage media;

transmission frame generating means for processing transmission framing to output data of said error correction coding means; and modulating means for modulating output data of said transmission frame generating means for transmitting or recording.

5. A multimedia information processing system according to claim 1, further comprising:

software processing means having application program for changing operation modes of said information-source coding means or said packet multiplexing means.

6. A multimedia information processing system according to claim 1, wherein said packet multiplexing means adds additional information to the element packets pertaining to media identification corresponding to media information, packet synchronization, and fixed packet length synchronization, and said packet multiplexing means multiplexes by using a fixed-length packet as a unit while executing speed matching.

7. A multimedia information processing system according to claim 1, wherein said transmitting processing means executes TCP/UDP/XTP processing for the multiplexed streams, and then executes IP processing to send the multiplexed stream to internet protocol transmission line.

8. A multimedia information processing system according to claim 1, further comprising:

element packet storage means for storing an element packet generated by the information-source coding means by using the element packet as a unit;

address managing means for memorizing addresses of the element packet stored in said element packet storage means; and element packet transmitting means for outputting the element packet indicated by said address managing means from said element packet storage means to the packet multiplexing means.

9. A multimedia information processing system according to claim 1, further comprises:

multiplexed stream storage means for storing a multiplexed stream generated by the packet multiplexing means;

multiplexed stream managing means for memorizing the address of said multiplexed stream stored in said multiplexed stream storage means; and multiplexed stream transmitting means for outputting the multiplexed stream indicated by the multiplexed stream managing means from said multiplexed stream storage means to said transmitting processing means.

10. A multimedia information processing system executing reception and/or storage of multimedia information comprises:

receive processing means for decoding a packet multiplexed signal transmitted in a format suited to a particular transmission media, in accordance with the characteristics of said transmission media to output a multiplexed stream;

packet separating means for separating an element packet required for generating media information at a media unit from the multiplexed stream; and information-source decoding means for executing information-source decoding of the separated element packet at the media unit and reproducing media information according to additional information added to the separated element packet to execute media identification, packet synchronization and reproductive synchronization.

11. A multimedia information processing system according to claim 10, wherein said receive processing means comprises:

demodulating means for demodulating the packet multiplexed signal in accordance with the characteristics of transmission media;

transmission frame reproducing means for establishing transmission frame synchronization from the output signal of said demodulating means to decompose frame; and error correction decoding means for establishing error correction frame synchronization from the output of said transmission frame reproducing means to execute error correction decoding and outputting multiplexed stream.

12. A multimedia information processing system according to claim 11, wherein when uncorrectable error has been generated, the error correction decoding means outputs a correction generating signal that indicates the area where the error exists in addition to multiplexed stream.

13. A multimedia information processing system according to claim 10, wherein said information-source decoding means comprises:

packet separating means for separating additional information in the element packet, and coded element media information;

decoding means for decoding said coded element media information; and decoded data reproducing means for synchronizing decoded element media information, which said information-source decoding means output, to generate media information.

14. A multimedia information processing system according to claim 10, further comprises:

software processing means having an application program that changes operation mode of said information-source decoding processing means or said packet separating means.

15. A multimedia information processing system according to claim 10, wherein said packet separating means separates multiplexed stream multiplexed by using an element packet as a unit, to each element packet unit and outputs each element packet to said information-source decoding processing means.

16. A multimedia information processing system according to claim 10, wherein said packet separating means separates multiplexed stream multiplexed by using a fixed length packet in which divided element packets were contained as a unit, to a fixed length packet unit to reform the element packet, and outputs each element to said information-source decoding processing means.

17. A multimedia information processing system according to claim 10, wherein said receive processing means executes IP processing of data that is transmitted from an internet protocol transmission line, and then, executes TCP/UDP/XTP processing to receive packet multiplexed stream.

18. A multimedia information processing system according to claim 10, wherein said packet separating means comprises:

received element packet storage portion for storing separated element packets;

received program managing means for memorizing the addresses of the element packets stored in said received element packet storage portion; and received element packet reading means for outputting an element packet necessary for generating a program instructed from said received program managing means, from said received element packet storage means to said information-source decoding processing means.

19. A multimedia information processing system executing transmission and/or storage of multimedia information comprises:

received processing means for inputting packet multiplexed signals which are multiplexed into packet and transmitted in a format suited to a particular transmission media, from one or more transmission media, and generating a packet multiplexed stream for each transmission media;

packet separating means for separating the packet multiplexed stream into an element packet for each transmission media;

packet re-multiplexing means for re-multiplexing the element packet into one multiplexed stream; and transmission processing means for outputting the one multiplexed stream, which said packet re-multiplexing means outputs, to a transmission media as a transmission signal in accordance with characteristics of the transmission media.

20. A multimedia information processing system comprises:

information-source coding processing means for executing information-source coding of respective different types of signals to generate respective coded bit sequences;

media multiplexing means for storing identification information to identify the type of signal and the respective coded bit sequences in a fixed length packet unit to generate a fixed length packet sequence;

structure multiplexing means for setting a predetermined number of fixed length packets in said fixed length packet sequence, into a given sized frame together with various data; and transmission processing means for generating a transmission signal with a transmission frame suited to a particular transmission media corresponding to the frame sequence output from said structure multiplexing means.

21. A multimedia information processing system according to claim 20, wherein said structure multiplexing means multiplexes the fixed length packet with data of control information, instruction information or clock information.

22. A multimedia information processing system comprises:

receive processing means for receiving a transmission signal having transmission frame sequences each having a predetermined number of fixed length packets in a predetermined sized frame together with various data, and for reproducing multiplexed bit sequences;

structure separating means for reproducing fixed length packet sequences and various data from said multiplexed bit sequence;

media separating means for taking out fixed length packets from the fixed length packet sequences, and reproducing coded bit sequences corresponding to identification information that identifies a type of transmission signal; and information-source decoding processing means for decoding said coded bit sequence to reproduce the transmission signal in accordance with a particular kind of transmission media.

23. A multimedia information processing system according to claim 23, wherein said structure separating means separates various data from said multiplexed bit sequence, such as control information, instruction information or clock information, and a fixed length packet.

* * * * *